United States Patent
Sawada et al.

(10) Patent No.: US 10,283,760 B2
(45) Date of Patent: May 7, 2019

(54) NONAQUEOUS ELECTROLYTE SECONDARY BATTERY AND BATTERY PACK OF SAME

(71) Applicant: KANEKA CORPORATION, Osaka-shi (JP)

(72) Inventors: Yuuki Sawada, Settsu (JP); Yukimasa Niwa, Settsu (JP)

(73) Assignee: KANEKA CORPORATION, Osaka-shi (JP)

( * ) Notice: Subject to any disclaimer, the term of this patent is extended or adjusted under 35 U.S.C. 154(b) by 272 days.

(21) Appl. No.: 15/111,736

(22) PCT Filed: Dec. 18, 2014

(86) PCT No.: PCT/JP2014/083596
§ 371 (c)(1),
(2) Date: Jul. 14, 2016

(87) PCT Pub. No.: WO2015/107832
PCT Pub. Date: Jul. 23, 2015

(65) Prior Publication Data
US 2016/0351891 A1    Dec. 1, 2016

(30) Foreign Application Priority Data
Jan. 16, 2014 (JP) ................................ 2014-006057

(51) Int. Cl.
| | |
|---|---|
| *H01M 4/36* | (2006.01) |
| *H01M 4/131* | (2010.01) |
| *H01M 4/505* | (2010.01) |
| *H01M 4/525* | (2010.01) |
| *H01M 10/052* | (2010.01) |
| *H01M 10/0567* | (2010.01) |
| *H01M 10/0568* | (2010.01) |
| *H01M 4/48* | (2010.01) |
| *H01M 4/485* | (2010.01) |
| *H01M 10/0525* | (2010.01) |
| *H01M 4/02* | (2006.01) |

(52) U.S. Cl.
CPC .......... *H01M 4/364* (2013.01); *H01M 4/131* (2013.01); *H01M 4/483* (2013.01); *H01M 4/485* (2013.01); *H01M 4/505* (2013.01); *H01M 4/525* (2013.01); *H01M 10/052* (2013.01); *H01M 10/0525* (2013.01); *H01M 10/0567* (2013.01); *H01M 10/0568* (2013.01); *H01M 2004/028* (2013.01); *H01M 2300/0025* (2013.01); *Y02T 10/7011* (2013.01)

(58) Field of Classification Search
CPC .................... H01M 4/364; H01M 10/0567
USPC ........................................................ 429/158
See application file for complete search history.

(56) References Cited

U.S. PATENT DOCUMENTS

| | | | | |
|---|---|---|---|---|
| 2007/0178380 A1* | 8/2007 | Iwanaga | ........... | H01M 10/0567 429/231.4 |
| 2012/0037846 A1* | 2/2012 | Lee | ........ | C01G 39/02 252/182.1 |
| 2012/0308881 A1* | 12/2012 | Tokuda | ............ | H01M 10/0567 429/199 |
| 2013/0108925 A1 | 5/2013 | Holzapfel | | |
| 2013/0252076 A1* | 9/2013 | Hoshina | ................ | H01M 4/505 429/163 |
| 2015/0125761 A1* | 5/2015 | Shimamoto | ....... | H01M 10/0525 429/338 |
| 2016/0181672 A1* | 6/2016 | Abe | ..................... | H01M 4/485 429/332 |

FOREIGN PATENT DOCUMENTS

| | | |
|---|---|---|
| JP | 07-134985 A | 5/1995 |
| JP | 2002-124297 A | 4/2002 |
| JP | 3502118 B2 | 3/2004 |
| JP | 2005-259641 A | 9/2005 |
| JP | 2006-278322 A | 10/2006 |
| JP | 2007-287518 A | 11/2007 |
| JP | 2011-014379 A | 1/2011 |
| JP | 2012-018775 A | 1/2012 |
| WO | 2012/023501 A1 | 2/2012 |
| WO | 2013/168821 A1 | 11/2013 |

OTHER PUBLICATIONS

International Search Report dated Feb. 17, 2015 for PCT/JP2014/083596 Filed on Dec. 18, 2014.

* cited by examiner

*Primary Examiner* — James M Erwin
(74) *Attorney, Agent, or Firm* — Oblon, McClelland, Maier & Neustadt, L.L.P.

(57) ABSTRACT

A nonaqueous electrolyte secondary battery, wherein the negative electrode contains a titanium-containing oxide; the positive electrode contains a spinel type lithium manganate, and a cobalt-containing compound and/or a lithium-transition metal composite oxide having a stratified rock salt type structure; and the nonaqueous electrolyte contains one compound selected from the group consisting of an organic compound having an oxalic acid backbone, an organic compound having an isocyanate group, a lithium salt of an organic compound having a sulfonic acid backbone, and a succinic anhydride compound having a side chain with 3 or more carbon atoms in a content of 0.01 to 5% by weight with respect to 100% by weight of the nonaqueous electrolyte.

20 Claims, No Drawings

NONAQUEOUS ELECTROLYTE SECONDARY BATTERY AND BATTERY PACK OF SAME

TECHNICAL FIELD

The present invention relates to a nonaqueous electrolyte secondary battery and a battery pack thereof.

BACKGROUND ART

Recently, active researches and developments of non-aqueous electrolyte secondary batteries for use in portable devices, hybrid cars, electric cars, and storage of electricity for home use have been carried out. It is required to have high safety and a high capacity for nonaqueous electrolyte secondary batteries used in these fields.

In order to satisfy the requirement, nonaqueous electrolyte secondary batteries using a titanium-containing oxide such as lithium titanate or titanium dioxide as a negative electrode active material, which is coated on an electric collector of a negative electrode, are developed (for example, Patent Document 1).

The nonaqueous electrolyte secondary battery using the titanium-containing oxide as the active material of the negative electrode, however, has a defect in which gases are generated during a charge/discharge cycle, whereby the battery is expanded due to the internal pressure, thus resulting in decreased battery characteristics.

CITATION LIST

Patent Literatures

Patent Document 1: Japanese Patent No. 3502118

SUMMARY OF INVENTION

Technical Problem

The present invention aims at providing a nonaqueous electrolyte secondary battery hardly generating gases during an operating cycle and capable of expressing excellent cycle stability.

Solution to Problem

As a result of painstaking studies by the present inventors, they have found that when a spinel type lithium manganate is used together with a cobalt compound and/or a stratified rock salt type structure compound for a positive electrode in a specific ratio, and compounds added to a nonaqueous electrolyte are selected, the gas generation can be suppressed during the charge/discharge cycle, and a charge final voltage can be increased comparted to the voltage conventionally obtained, in the secondary battery in which the titanium-containing oxide is used for the negative electrode; have succeeded to produce a nonaqueous electrolyte secondary battery having excellent cycle stability and improved charging rate characteristic; and have completed the present invention.

The present invention, accordingly, provides a nonaqueous electrolyte secondary battery containing a negative electrode, a positive electrode, and a nonaqueous electrolyte between the negative electrode and the positive electrode, wherein the negative electrode contains a titanium-containing oxide as a negative electrode active material, the positive electrode contains, as a positive electrode active material, a spinel type lithium manganate represented by $Li_{1+x}M_yMn_{2-x-y}O_4$ wherein $0 \leq x \leq 0.2$; $0 < y \leq 0.6$; and M is at least one element selected from the group consisting of elements belonging to Groups 2 to 13 and Periods 3 and 4 provided that Mn is excluded, and a cobalt-containing compound and/or a lithium-transition metal composite oxide having a stratified rack salt type structure, a relationship: $0.01 \leq B/(A+B) \leq 0.1$ is satisfied wherein A is a weight of the spinel type lithium manganate; and B is a weight of the cobalt-containing compound and/or the lithium-transition metal composite oxide having the stratified rock salt type structure, and the nonaqueous electrolyte contains one compound selected from the group consisting of an organic compound having an oxalic acid backbone, an organic compound having an isocyanate group, a lithium salt of an organic compound having a sulfonic acid backbone, and a succinic anhydride compound having a side chain with 3 or more carbon atoms in a content of 0.01 to 5% by weight with respect to 100% by weight of the nonaqueous electrolyte.

In the nonaqueous electrolyte secondary battery of the present invention, it is preferable that the organic compound having an oxalic acid backbone is a compound represented by the following general formula (1):

[C. 1]

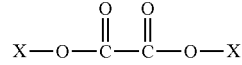

(1)

In the formula (1), X is an alkyl group having 1 to 6 carbon atoms, an alkenyl group having 2 to 6 carbon atoms, or an alkynyl group having 2 to 6 carbon atoms.

In the nonaqueous electrolyte secondary battery of the present invention, it is preferable that the organic compound having an isocyanate group is a compound represented by the following general formula (2):

[C. 2]

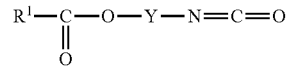

(2)

In the formula (2), $R^1$ is an hydrogen atom, an alkyl group having 1 to 6 carbon atoms, an alkenyl group having 2 to 6 carbon atoms, an aryl group having 6 to 12 carbon atoms, an alkyloxy group having 1 to 6 carbon atoms, an alkenyloxy group having 2to6 carbon atoms, an isocyanatoalkyloxy group having 2 to 6 carbon atoms, or an aryloxy group having 6 to 12 carbon atoms, in which at least one hydrogen atom in the alkyl group, the alkenyl group, the aryl group, the alkyloxy group, the alkenyloxy group, and the isocyanatoalkyloxy group may be substituted by a halogen atom; and Y is an alkylene group having 1 to 6 carbon atoms in which at least one hydrogen atom may be substituted by a halogen atom, or a bivalent linking group having 2 to 6 carbon atoms and containing at least one ether bond.

In the nonaqueous electrolyte secondary battery of the present invention, it is preferable that the lithium salt of an organic compound having a sulfonic acid backbone is a compound represented by the following general formula (3):

[C. 3]

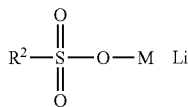

(3)

In the formula (3), $R^2$ is an alkyl group having 1 to 6 carbon atoms; and M is $BF_3$ or $PF_5$.

In the nonaqueous electrolyte secondary battery of the present invention, it is preferable that the succinic anhydride compound having a side chain with 3 or more carbon atoms is a compound represented by the following general formula (4):

[C. 4]

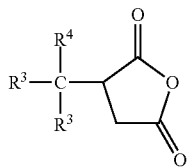

(4)

In the formula (4), $R^3$ and $R^4$ are each independently a hydrogen atom, a halogen atom, or alkyl group having 1 to 6 carbon atoms in which at least one hydrogen atom may be substituted by a halogen; and $R^5$ is an alkenyl group having 2 to 4 carbon atoms and a double bond at the terminal, or an alkynyl group having 2 to 4 carbon atoms and a triple bond at the terminal.

In the nonaqueous electrolyte secondary battery of the present invention, it is preferable that M is at least one element selected from the group consisting of Al, Mg, Zn, Ni, Co, Fe, Ti, Cu, and Cr, and the M is contained in $Li_{1+x}M_yMn_{2-x-y}O_4$ wherein $0 \leq x \leq 0.2$; $0 < y \leq 0.6$; and M is at least one element selected from the group consisting of elements belonging to Groups 2 to 13 and Periods 3 and 4 provided that Mn is excluded.

In the nonaqueous electrolyte secondary battery of the present invention, it is preferable that the positive electrode contains, as the positive electrode active material, the spinel type lithium manganate represented by $Li_{1+x}M_yMn_{2-x-y}O_4$ wherein $0 \leq x \leq 0.2$; $0 < y \leq 0.6$; and M is at least one element selected from the group consisting of elements belonging to Groups 2 to 13 and Periods 3 and 4 provided that Mn is excluded, and the lithium-transition metal composite oxide having a stratified rock salt type structure.

In the nonaqueous electrolyte secondary battery of the present invention, it is preferable that the lithium-transition metal composite oxide having the stratified rock salt type structure is a compound represented by $Li_aNi_bCo_cMn_dX_eO_2$ wherein X is at least one element selected from B, Mg, Al, Si, Ti, V, Cr, Fe, Cu, Zn, Ga, Ge, Sr, Zr, Nb, Mo, in, and Sn; $0 < a \leq 1.2$; $0 \leq b$, c, d, $e \leq 1$; and $b+c+d+e=1$.

In the nonaqueous electrolyte secondary battery of the present invention, it is preferable that the lithium-transition metal composite oxide having the stratified rock salt type structure is lithium cobaltate represented by $LiCoO_2$.

In the nonaqueous electrolyte secondary battery of the present invention, it is preferable that the cobalt-containing compound is at least one compound selected from the group consisting of $Co_3O_4$, $Co_2O_3$, CoO, CoOOH, and $CoCO_3$.

In the nonaqueous electrolyte secondary battery of the present invention, it is preferable that the titanium-containing oxide is lithium titanate and/or titanium dioxide.

A battery pack of the present invention is a battery pack in which a plurality of nonaqueous electrolyte secondary batteries of the present invention are connected to each other.

Advantageous Effects of Invention

The nonaqueous electrolyte secondary battery of the present invention hardly generates gases during the charge/discharge cycle, and has the excellent cycle stability and the excellent charging rate characteristics.

DESCRIPTION OF EMBODIMENTS

Embodiments of the present invention are explained below.

A scope of the present invention is shown by claims, and it is intended to encompass all variations within a meaning and a range equivalent to claims.

The nonaqueous electrolyte secondary battery of the present invention is formed from a negative electrode, a positive electrode, a separator, and a nonaqueous electrolyte.

<1. Negative Electrode>

In the negative electrode used in the nonaqueous electrolyte secondary battery of the present invention, a negative electrode active material layer containing at least a negative electrode active material is formed on an electric collector. In order to improve properties of the negative electrode active material layer, a conductive assistant and a binder may be contained.

The nonaqueous electrolyte secondary battery of the present invention contains a titanium-containing oxide as the negative electrode active material. Lithium titanate and titanium dioxide are preferable as the titanium-containing oxide. Of these, the lithium titanate is more preferable because it has a high stability, and lithium titanate having a spinel structure is particularly preferable because expansion and contraction of the active material is small in a reaction of insertion/desorption of lithium ions. The lithium titanate may contain a slight amount of elements other than lithium and titanium, such as Nb.

The titanium dioxide may be exemplified by B-type titanium dioxide, anatase-type titanium dioxide, ramsdellite type titanium dioxide, and the like. The B-type titanium dioxide is preferable because of a small irreversible capacity and the excellent cycle stability.

The surface of the titanium-containing oxide may be covered with a carbon material, a metal oxide, a polymer, or the like in order to improve the electroconductivity and the stability.

The titanium-containing oxide may be used alone or as a combination of two or more kinds.

The negative electrode in the present invention may contain the conductive assistant. The conductive assistant is not particularly limited, and metal materials and carbon materials are preferable. The metal material may include copper, nickel, and the like, and the carbon material may include natural graphite, artificial graphite, carbon fibers obtained by a vapor phase epitaxy, carbon nanotube, acetylene black, Ketjen black, furnace black, and the like. The conductive assistants may be used alone or as a combination of two or more kinds.

In the present invention, an amount of the conductive assistant contained in the negative electrode is preferably 1 part by weight or more and 30 parts by weight or less, more preferably 2 parts by weight or more and 15 parts by weight or less, based on 100 parts by weight of the negative electrode active material. When the amount is within the range described above, the electroconductivity of the negative electrode can be ensured. In addition, an adhesiveness with a binder described below can be maintained and a sufficient adhesiveness with the electric collector can be obtained.

In the negative electrode in the present invention, a binder may be used in order to bind the active material to the electric collector. The binder is not particularly limited, and it is possible to use, for example, at least one compound selected from the group consisting of polyvinylidene fluoride (PVdF), polytetrafluoroethylene (PTFE), styrene-butadiene rubber, polyimide, and derivatives thereof. It is preferable that the binder is in a state in which it is dissolved or dispersed in a nonaqueous solvent or water, because the negative electrode is easily fabricated. The nonaqueous solvent is not particularly limited, and may include, for example, N-methyl-2-pyrrolidone (NMP), N,N-dimethylformamide, N,N-dimethylacetamide, methyl ethyl ketone, methyl acetate, ethyl acetate, tetrahydrofuran, and the like. A dispersing agent or a thickener may be added thereto.

In the present invention, an amount of the binder contained in the negative electrode is preferably 1 part by weight or more and 30 parts by weight or less, more preferably 2 parts by weight or more and 15 parts by weight or less, based on 100 parts by weight of the negative electrode active material. When the amount is within the range described above, the adhesiveness between the negative electrode active material and the conductive assistant can be maintained and the sufficient adhesiveness with the electric collector can be obtained.

In the nonaqueous electrolyte secondary battery of the present invention, one preferable embodiment of the negative electrode is produced by forming a negative electrode active material layer from a mixture of the negative electrode active material, the conductive assistant, and the binder on an electric collector. A method is preferably in which slurry is produced from the mixture described above and a solvent, the electric collector is coated with the obtained slurry, and the solvent is removed to form the negative electrode, because of the easy production method.

As the electric collector, which can be used in the negative electrode in the present invention, copper, SUS, nickel, titanium, aluminum, and alloy thereof are preferable.

A thickness of the electric collector is not particularly limited, and is preferably 10 µm or more and 100 µm or less. When the thickness is less than 10 µm, the handling becomes difficult on the fabrication, and the thickness of more than 100 µm is economically disadvantageous.

As the electric collector, it is possible to use a product in which a surface of a metal material (copper, SUS, nickel, titanium, or alloy thereof) is coated with another metal which is not reactive at a potential of the negative electrode.

In the present invention, a thickness of the negative electrode active material layer is not particularly limited, and it is preferably 10 µm or more and 200 µm or less. When the thickness is less than 10 µm, it may sometimes be difficult to obtain a desired electric capacity, and when it is more than 200 µm, it may sometimes be difficult to obtain a desired output density.

In the present invention, a density of the negative electrode active material layer is preferably 1.0 $g/cm^3$ or more and 3.0 $g/cm^3$ or less. When the density is less than 1.0 $g/cm^3$, the contact between the negative electrode active material and the conductive assistant becomes insufficient, and an electron conductivity may sometimes be decreased. When it is more than 3.0 $g/cm^3$, a nonaqueous electrolyte described below penetrates the negative electrode with difficulty, and lithium ion conductivity is decreased, or a compound contained in the nonaqueous electrolyte, described below, cannot be spread all over the entire negative electrode, and the inhibition of gas generation tends Co be decreased. The density of the negative electrode active material layer is more preferably 1.3 $g/cm^3$ or more and 2.7 $g/cm^3$ or less, because the negative electrode active material is sufficiently brought into contact with the conductive assistant and the nonaqueous electrolyte, described below, easily penetrates the negative electrode, and the density is particularly preferably 1.5 $g/cm^3$ or more and 2.5 $g/cm^3$ or less, because the contact between the negative electrode active material and the conductive assistant, and the easiness of the penetration of the nonaqueous electrolyte into the negative electrode are best balanced.

The density of the negative electrode active material layer can be controlled by compressing an electrode to a desired thickness. The compression method is not particularly limited, and it can be performed, for example, by using a roll press, oil hydraulic press, or the like. The electrode may be compressed before or after formation of a positive electrode described below. The density of the negative electrode active material layer can be calculated from the thickness and the weight of the negative electrode active material layer.

In the present invention, a specific surface area of the negative electrode active material layer is preferably 1 $m^2/g$ or more and 100 $m^2/g$ or less. The titanium-containing oxide used in the present invention, exemplified by lithium titanate or titanium dioxide, is lower in the expansion and contraction of the active material in the reaction of insertion/desorption of lithium ions compared to a conventionally used negative electrode active material exemplified by a graphite compound or a silicon compound. For that reason, a stirring effect of the nonaqueous electrolyte associated with the expansion and contraction is low, and it is difficult to spread the lithium ions throughout the negative electrode. In the negative electrode used in the present invention, accordingly, it is necessary to secure a place where lithium ions are inserted and desorbed in an amount equal to or more than a given amount, i.e., a specific surface area. When the specific surface area of the negative electrode active material layer is less than 1 $m^2/g$, a desired battery capacity may not be possibly taken out, because the insertion/desorption place of the lithium ions is too small. On the other hand, when it is more than 100 $m^2/g$, side reactions other than the insertion/desorption of the lithium ions, such as a decomposition reaction of the nonaqueous electrolyte, are easily advanced, and a desired battery capacity may not be possibly taken out.

The specific surface area of the negative electrode active material layer is more preferably 3 $m^2/g$ or more and 70 $m^2/g$ or less, because an insertion/desorption place of lithium ions capable of expressing a desired capacity can be secured, and the side reactions other than the insertion/desorption of lithium ions hardly occur. It is particularly preferably 5 $m^2/g$ or more and 50 $m^2/g$ or less, because the side reactions are least advanced, and the insertion and the desorption of the lithium ions are most balanced.

The specific surface area of the negative electrode active material layer can be controlled by the kinds and the blending ratio of the negative electrode active material, the conductive assistant, and the binder, and can also be controlled by compressing the electrode to a desired thickness.

The specific surface area of the negative electrode active material layer can be measured in a known method such as a mercury press-in method, a BET method, or a bubble point method.

In the present invention, an electric capacity per $cm^2$ of the negative electrode is preferably 0.5 mAh or more and 6.0 mAh or less. When the electric capacity is less than 0.5 mAh, a battery size having a desired capacity may be sometimes too big. On the other hand when it is more than 6.0 mAh, it may sometimes be difficult to obtain a desired output density. The electric capacity per cm2 of the negative electrode can be calculated by fabricating a negative electrode, then fabricating a half cell in which lithium metal is a counter electrode, and after that measuring charge/discharge characteristics of the half cell. The electric capacity per $cm^2$ of the negative electrode is not particularly limited. The electric capacity can be controlled by a weight of the negative electrode active material layer formed on per unit area of the electric collector, for example, a method in which a thickness of slurry of the negative electrode active material layer coated is controlled upon the slurry coating.

<2. Positive Electrode>

In the positive electrode used in the nonaqueous electrolyte secondary battery of the present invention, a positive electrode active material layer containing at least a positive electrode active material is formed on an electric collector. In order to improve properties of the positive electrode active material layer, a conductive assistant and a binder may be contained.

In the nonaqueous electrolyte secondary battery of the present invention, the positive electrode active material contains a spinel type lithium manganate (hereinafter which may be simply referred to as "spinel type lithium manganate") represented by $Li_{1+x}M_yMn_{2-x-y}O_4$ wherein $0 \leq x \leq 0.2$; $0 < y \leq 0.6$; and M is at least one element selected from the group consisting of elements belonging to Groups 2 to 13 and Periods 3 and 4 provided that Mn is excluded, and a cobalt-containing compound anchor a lithium-transition metal composite oxide having a stratified rock salt type structure.

(Spinel Type Lithium Manganate)

In the spinel type lithium manganate represented by $Li_{1+x}M_yMn_{2-x-y}O_4$ wherein $0 \leq x \leq 0.2$; $0 < y \leq 0.6$; and M is at least one element selected from the group consisting of elements belonging to Groups 2 to 13 and Periods 3 and 4 provided that Mn is excluded, as the element belonging to Groups 2 to 13 and Periods 3 and 4, Al, Mg, Zn, Ni, Co, Fe, Ti, Cu, and Cr are preferable, Al, Mg, Zn, Ni, Ti, and Cr are more preferable, because of the high effect of improving the stability of the positive electrode active material itself, and Al, Mg, Zn, Ti, and Ni are particularly preferable, because of the particularly high effect of improving the stability of the positive electrode active material itself.

In $Li_{1+x}M_yMn_{2-x-y}O_4$, x is $0 \leq x \leq 0.2$. When x<0, the capacity of the positive electrode active material tends to be decreased. On the other hand, when x>0.2, a large amount of impurities such as lithium carbonate may possibly be contained.

In $Li_{1+x}M_yMn_{2-x-y}O_4$, is $0 < y \leq 0.6$. When y=0, the stability of the positive electrode active material tends to be decreased. On the other hand, when y>0.6, a large amount of impurities such as oxide of M may possibly be contained.

Of the spinel type lithium manganates, one compound selected from $Li_{1+x}Al_yMn_{2-x-y}O_4$ ($0 \leq x \leq 0.1$, $0 < y \leq 0.1$), $Li_{1+x}Mg_yMn_{2-x-y}O_4$ ($0 \leq x \leq 0.1$, $0 < y \leq 0.1$), $Li_{1+x}Zn_yMn_{2-x-y}O_4$ ($0 \leq x \leq 0.1$, $0 < y \leq 0.1$), $Li_{1+x}Cr_yMn_{2-x-y}O_4$ ($0 \leq x \leq 0.1$, $0 < y \leq 0.1$), $Li_{1+x}Ni_yMn_{2-x-y}O_4$ ($0 \leq x \leq 0.05$, $0.45 < y \leq 0.5$), $Li_{1+x}Ni_{y-z}Al_zMn_{2-x-y}O_4$ ($0 \leq x \leq 0.05$, $0.45 \leq y \leq 0.5$, $0.005 \leq z \leq 0.03$), and $Li_{1+x}Ni_{y-z}Ti_zMn_{2-x-y}O_4$ ($0 \leq x \leq 0.05$, $0.45 \leq y \leq 0.5$, $0.005 \leq z \leq 0.03$) is preferable, because high effects of decreasing gas generation and increasing the charge final voltage can be obtained by the combination of the nonaqueous electrolyte described below; and $Li_{1+x}Al_yMn_{2-x-y}O_4$ ($0 \leq x \leq 0.1$, $0 < y \leq 0.1$), $Li_{1+x}Mg_yMn_{2-x-y}O_4$ ($0 \leq x \leq 0.1$, $0 < y \leq 0.1$), $Li_{1+x}Ni_yMn_{2-x-y}O_4$ ($0 \leq x \leq 0.05$, $0.45 < y \leq 0.5$), and $Li_{1+x}Ni_{y-z}Ti_zMn_{2-x-y}O_4$ ($0 \leq x \leq 0.05$, $0.45 \leq y \leq 0.5$, $0.005 \leq z \leq 0.03$) are particularly preferable, because the higher effects can be obtained.

(Cobalt-Containing Compound)

The cobalt-containing compound refers to a cobalt compound containing no Li, which is different from the spinel type lithium manganate described above and a lithium-transition metal composite oxide having the stratified rock salt type structure described below. The cobalt-containing compound in the present invention, i.e., the cobalt compound containing no Li may include cobalt oxide, cobalt hydroxide, cobalt carbonate, cobalt chloride, cobalt sulfate, cobalt-containing organic compounds, and cobalt fluoride. Of these, the cobalt oxide, cobalt hydroxide, and cobalt carbonate are preferable, because high effects of decreasing gas generation and increasing the charge final voltage can be obtained by the combination of the nonaqueous electrolyte described below, and $Co_3O_4$, $Co_2O_3$, CoO, CoOOH, and $CoCO_3$ are particularly preferable because the particularly high effects can be obtained.

(Lithium-transition Metal Composite Oxide Having Stratified Rock Salt Type Structure)

As the lithium-transition metal composite oxide having the stratified rock salt type structure, compounds represented by $Li_aNi_bCo_cMn_dX_eO_2$ wherein X is at least one element selected from the group consisting of B, Mg, Al, Si, Ti, V, Cr, Fe, Cu, Zn, Ga, Ge, Sr, Zr, Nb, Mo, In, Sn; $0 \leq b$, c, d, $e \leq 1$, and b+c+d+e=1 are preferable. Of these, one compound selected from $LiNi_{1/3}Co_{1/3}Mn_{1/3}O_2$, $LiNi_{0.5}Co_{0.2}Mn_{0.3}O_2$, $LiNi_{0.5}Mn_{0.5}O_2$, $LiMn_{0.4}Ni_{0.4}Co_{0.2}O_2$, $LiMn_{0.1}Ni_{0.1}Co_{0.8}O_2$, $LiNi_{0.8}Co_{0.16}Al_{0.04}O_2$, $LiNi_{0.8}Co_{0.15}Al_{0.05}O_2$, $LiNiO_2$, $LiMnO_2$, and $LiCoO_2$ are more preferable, because high effects of decreasing gas generation and increasing the charge final voltage can be obtained by the combination of the nonaqueous electrolyte described below, and $LiCoO_2$ is particularly preferable, because the particularly high effects can be obtained. The lithium-transition metal composite oxides having the stratified rock salt type structure include $Li_aNi_bCo_cMn_dX_eO_2$ wherein a is more than 1, so-called lithium-rich compounds.

In the positive electrode used in the present invention, the spinel type lithium manganate, and the cobalt-containing compound and/or the lithium-transition metal composite oxide having the stratified rock salt type structure are contained in a range of $0.01 \leq B/(A+B) \leq 0.1$ wherein A is a weight of the spinel type lithium manganate, and B is a weight of the cobalt-containing compound and/or the lithium-transition metal composite oxide having the stratified rock salt type structure. It has been found that high effects of inhibiting gas generation and increasing the charge final voltage can be obtained by the combination of the nonaqueous electrolyte described below within the range described above. When B/(A+B) is less than 0.01, the high effect of inhibiting gas generation during the operating cycle, obtained by the combination of the material, the titanium-containing oxide, and a compound contained in the nonaqueous electrolyte described below, may not be possibly expressed. In addition, only the low effect of inhibiting the gas generation associated with the increase of the voltage when the charge final voltage is increased may be possibly obtained. On the other hand, when B/(A+B) is more than 0.1, the decomposition reaction of the cobalt-containing compound and/or the lithium-transition metal composite oxide having the stratified rock salt type structure is preferentially advanced when the potential of the positive electrode is increased, such as overcharge, oxygen release or an exothermic reaction is out of control, and battery explosion or the like is highly likely to occur.

The range B/(A+B) is preferably $0.02 \leq B/(A+B) \leq 0.1$., because the high effects of inhibiting gas generation during the operating cycle and increasing the charge final voltage can be obtained by the combination of the nonaqueous electrolyte described below, and the range is more preferably $0.02 \leq B/(A+B) < 0.05$, because the particularly high effects can be obtained.

In the nonaqueous electrolyte secondary battery of the present invention, the positive electrode more preferably contains the spinel type lithium manganate and the lithium-transition metal composite oxide having the stratified rock salt type structure as the positive electrode active material.

In the present invention, in order to inhibit the gas generation at the negative electrode which contains titanium-containing oxide, as the negative electrode active material, nonaqueous electrolyte containing a compound which is coordinated at an active point of the lithium titanate owing to the presence of a specific backbone and has an action of being polymerized and coating the negative electrode is used. In an initial stage, however, the coating of the negative electrode by the polymerization is insufficient, and thus a certain amount of gas is generated at the negative electrode. In order to absorb the gas generated in the initial stage, it can be considered to add the lithium-transition metal composite oxide having the stratified rock salt type structure such as lithium cobaltate to the positive electrode. However, when the lithium-transit on metal composite oxide is added to the positive electrode, it is supposed that lithium ions ($Li^+$) are released in the state-of-charge, the structure cannot be maintained, and the layer is peeled off, thus resulting in a shortened. battery life, because the lithium-transition metal composite oxide has a layered structure. The present inventors, however, have found that hydrogen, once trapped in the layer of the lithium cobaltate, stays therein, different from the lithium ions ($Li^+$) released during the charging, and it maintains the layer structure of the lithium cobaltate instead of the lithium ions ($Li^+$) released, as a result, a positive electrode capable of absorbing the hydrogen gas, generated in the initial stage, and stably taking it can be obtained. According to the present invention, it can be supposed that the balance between the hydrogen generation at the negative electrode and the hydrogen gas absorption at the positive electrode is maintained, whereby a secondary battery can be provided which contains the titanium-containing oxide as the negative electrode active material, continuously inhibits the gas generation from the initial stage, and is stable for a long period of time.

Even a cobalt compound containing no Li, which is not the lithium-transition metal composite oxide having the stratified rock salt type structure such as lithium cobaltate as described above, has a certain effect of inhibiting the hydrogen gas generation at the negative electrode containing the titanium-containing oxide as the active material. However, according to such a compound, the gas generation cannot be completely inhibited, and in a case of cobalt oxide, even the hydrogen once absorbed is released in a certain amount depending on the charge/discharge state, which is different from the lithium cobaltate described above. Even the hydrogen gas, which is slightly released into the system, may result in a cause of the decrease of the capacity of the secondary battery or the like.

As described above, for the material contained together with the spinel type lithium manganate as the positive electrode active material, the lithium-transition metal composite oxide having the stratified rock salt type structure such as lithium cobaltate is more preferable than the cobalt-containing compound (cobalt compound containing no Li) in terms of the effect of inhibiting the gas generation.

The surface of the positive electrode active material used in the present invention may be covered with a carbon material, a metal oxide, a polymer, or the like in order to improve the electroconductivity and the stability.

The positive electrode in the present invention may contain a conductive assistant. The conductive assistant is not particularly limited, and a carbon material is preferable. Examples thereof may include natural graphite, artificial graphite, carbon fibers obtained by vapor phase epitaxy, carbon nanotube, acetylene black, Ketjen black, furnace black, and the like. The carbon materials may be used alone or as a combination of two or more kinds.

An amount of the conductive assistant in the positive electrode in the present invention is preferably 1 part by weight or more and 30 parts by weight or less, more preferably 2 parts by weight or more and 15 parts by weight or less, based on 100 parts by weight of the positive electrode active material. When the amount is within the range described above, the electroconductivity of the positive electrode is secured. In addition, the adhesiveness to a binder described below is maintained, and the sufficient adhesiveness with the electric collector can be obtained.

The positive electrode in the present invention may include a binder. The binder is not particularly limited, and, for example, at least one compound selected from the group consisting of polyvinylidene fluoride (PVdF), polytetrafluoroethylene (PTFE), styrene-butadiene rubber, polyimide, and derivatives thereof can be used. It is preferable that the binder is dissolved or dispersed in a nonaqueous solvent or water, because the positive electrode is easily fabricated. The nonaqueous solvent is not particularly limited, and may include, for example, N-methyl-2-pyrrolidone (NMP), N,N-dimethylformamide, N,N-dimethylacetamide, methyl ethyl ketone, methyl acetate, ethyl acetate, tetrahydrofuran, and the like. A dispersing agent or a thickener may be added thereto.

An amount of the binder contained in the positive electrode in the present invention is preferably 1 part by weight or more and 30 parts by weight or less, more preferably 2 parts by weight or more and 15 parts by weight or less, based on 100 parts by weight of the positive electrode active material. When the amount is within the range described above, the adhesiveness between the positive electrode active material and the conductive assistant is maintained and the sufficient adhesiveness with the electric collector can be obtained.

The fabrication method of the positive electrode in the present invention may include a method in which the spinel type lithium manganate and the cobalt-containing compound and/or lithium-transition metal composite oxide having the stratified rock salt type structure are mixed, to which the conductive assistant and the binder are added, and the obtained mixture is coated on the electric collector; a method in which the spinel type lithium manganate, the cobalt-containing compound and/or lithium-transition metal composite oxide having the stratified rock salt type structure, the conductive assistant, and the binder are mixed together, and the obtained mixture is coated on the electric collector; and the like. A method for fabricating the positive electrode in which slurry is produced from the mixture and a solvent, the obtained slurry is coated on the electric collector, and the solvent is removed is especially preferable, because of the ease of the fabrication method.

Aluminum and alloy thereof are preferable as the electric collector used in the positive electrode in the present invention. The aluminum is not particularly limited, because the aluminum is stable in the positive electrode reaction atmosphere, and high purity aluminum, exemplified by JIS 1030, 1050, 1085, 1N90, 1N99, or the like, is preferable.

A thickness of the electric collector is not particularly limited, and preferably 10 μm or more and 100 μm or less. When the thickness is less than 10 μm, the handling becomes difficult in terms of the fabrication, and a thickness of more than 100 μm is economically disadvantageous.

As the electric collector, a product in which a surface of a metal other than aluminum (copper, SUS, nickel, titanium, or alloy thereof) is coated with aluminum may also be used.

A thickness of the positive electrode active material layer in the present invention is not particularly limited, and is preferably 10 μm or more and 200 μm or less. When the thickness is less than 10 μm, it may sometimes be difficult to obtain a desired capacity, and when it is more than 200 μm, it may sometimes be difficult to obtain a desired output density.

A density of the positive electrode active material layer in the present invention is preferably 1.0 g/cm$^3$ or more and 4.0 g/cm$^3$ or less. When the density is less than 1.0 g/cm$^3$, the contact between the positive electrode active material and the conductive assistant becomes insufficient, and the electron conductivity may sometimes be decreased. On the other hand, when it is more than 4.0 g/cm$^3$, it is difficult that the electrolytic solution penetrates into the positive electrode, and the lithium conductivity may sometimes be decreased. The density of the positive electrode is preferably 1.5 g/cm$^3$ or more and 3.5 g/cm$^3$ or less, because the positive electrode active material is sufficiently brought into contact with the conductive assistant, and the nonaqueous electrolyte described below can easily penetrate into the positive electrode, and it is particularly preferably 2.0 g/cm$^3$ or more and 3.0 g/cm$^3$ or less, because the contact between the positive electrode active material and the conductive assistant, and the easiness of the penetration of the nonaqueous electrolyte into the positive electrode are best balanced.

The density of the positive electrode active material layer can be controlled by compressing the electrode to a desired thickness. The compressing method is not particularly limited, and is performed, for example, by using a roll press, a hydraulic press, or the like. The electrode may be compressed before or after the formation of the negative electrode described above. The density of the positive electrode active material layer can be calculated from the thickness and the weight of the positive electrode active material layer.

In the present invention, a specific surface area of the positive electrode active material layer is preferably 1 m$^2$/g or more and 100 m$^2$/g or less. The spinel type lithium manganate used in the present invention, is lower in the expansion and contraction of the active material in the reaction of insertion/desorption of lithium ions, compared to a conventionally used positive electrode active material exemplified by LiCoO$_2$. In the present invention, it is contained in the range of 0.01≤B/(A+B)≤0.1 wherein A is a weight of the spinel type lithium manganate and B is a weight of the cobalt-containing compound and/or the lithium-transition metal composite oxide having the stratified rock salt type structure, but the stirring effect of the nonaqueous electrolyte associated with the expansion and contraction of the whole positive electrode is low, and it is difficult to spread the lithium ions throughout the positive electrode, compared to the case of using 100% of the conventional positive electrode active material exemplified by LiCoO$_2$. For that reason, it is necessary for the positive electrode active material layer in the present invention to secure a place where lithium ions are inserted and desorbed in an amount equal to or more than a given amount, i.e., a specific surface area of the positive electrode active material layer. When the specific surface area is less than 1 m$^2$/g, a desired battery capacity may not be possibly taken out, because the insertion/desorption place of the lithium ions is too small. On the other hand, when it is more than 100 m$^2$/g, side reactions other than the insertion/desorption of the lithium ions, such as a decomposition reaction of the nonaqueous electrolyte, are easily advanced, and it may be impossible to inhibit the gas generation by the combination in the present invention.

The specific surface area is more preferably 3 m$^2$/g or more and 70 m$^2$/g or less, because the insertion/desorption place of the lithium ions capable of realizing a desired capacity is secured, and the side reaction other than the insertion/desorption of the lithium ions hardly occur. It is particularly preferably 5 m$^2$/g or more and 50 m$^2$/g or less, because the side reactions are least advanced, and the balance of the secured insertion/desorption place of the lithium ions is most preferable.

The specific surface area of the positive electrode active material layer can be controlled by the kinds and the blending ratio of the positive electrode active material, the conductive assistant, and the binder, and can also be controlled by compressing the electrode to a desired thickness.

The specific surface area of the positive electrode active material layer can be measured in a known method such as a mercury press-in method, a BET method, or a bubble point method.

In the positive electrode in the present invention, an electric capacity per cm$^2$ of the positive electrode is preferably 0.5 mAh or more and 5.0 mAh or less. When the electric capacity is less than 0.5 mAh, a battery size having a desired capacity tends to be too big. When it is more than 5.0 mAh, it tends to be difficult to obtain a desired output density. The electric capacity per cm$^2$ of the positive electrode may be calculated by fabricating a positive electrode, then fabricating a half cell in which lithium metal is a counter electrode, and after that measuring charge/discharge characteristics.

The electric capacity per cm$^2$ of the positive electrode is not particularly limited. The electric capacity can be controlled by a weight of the positive electrode active material layer formed on per unit area of the electric collector, for example, a method in which a thickness of slurry of the positive electrode active material layer coated is controlled upon the slurry coating.

<3. Separator>

The separator used in the nonaqueous electrolyte secondary battery of the present invention is disposed between the positive electrode and the negative electrode, and may be a material which is insulating and is capable of including a nonaqueous electrolyte described below. Example thereof may include nylon, cellulose, polysulfone, polyethylene, polypropylene, polybutene, polyacrylonitrile, polyimide, polyamide, polyethylene terephthalate, and woven fabrics, non-woven fabrics, and fine porous films, which are composites of two or more kinds thereof, and the like. The nylon, cellulose, polysulfone, polyethylene, polypropylene, polybutene, polyacrylonitrile, polyimide, polyamide, polyethylene terephthalate, and the non-woven fabric which is the composite of the two or more kind thereof are preferable, because of the excellent stability of the cycle characteristics.

The separator may include various plasticizers, antioxidants, or flame-retardants, or may be coated with a metal oxide, or the like.

A thickness of the separator is not particularly limited, and it is preferably 10 μm or more and 100 μm or less. When the thickness is less than 10 μm, the positive electrode is brought into contact with the negative electrode to cause a short circuit. When it is more than 100 μm, the resistance of the battery may sometimes be increased. The thickness is more preferably 15 μm or more and 50 μm or less in terms of the economy and the handling.

A porosity of the separator is preferably 30% or more and 90% or less. When the porosity is less than 30%, diffusibility of lithium ions is decreased, thus resulting in the remarkably decreased cycle characteristics. On the other hand, when it is more than 90%, uneven parts of the electrode penetrate through the separator and the short circuit is highly likely formed. The porosity is more preferably 35% or more and 85% or less, in terms of the balance between the securing of the diffusibility of lithium ions and the prevention of the short circuit, and is particularly preferably 40% or more and 80% or less, because of the particularly excellent balance.

The porosity can be measured in a known method such as a mercury press-in method or a bubble point method.

<4. Nonaqueous Electrolyte>

The nonaqueous electrolyte used in the nonaqueous electrolyte secondary battery of the present invention is not particularly limited, and a nonaqueous electrolytic solution in which a solute is dissolved in a nonaqueous solvent can be used. The nonaqueous electrolytic solution, which is the nonaqueous electrolyte, may be used as a gel electrolyte in which the nonaqueous electrolytic solution is impregnated in a polymer.

As the nonaqueous solvent, it is preferable to include a cyclic aprotonic solvent and/or a linear aprotonic solvent. The cyclic aprotonic solvent may include cyclic carbonates, cyclic esters, cyclic sulfones, cyclic ethers, and the like. As the linear aprotonic solvent, solvents generally used for the nonaqueous electrolyte, such as linear carbonates, linear carboxylic acid esters, linear ethers, and acetonitrile may be used. More specifically, dimethyl carbonate, methylethyl carbonate, diethyl carbonate, dipropyl carbonate, methylpropyl carbonate, ethylene carbonate, propylene carbonate, butylene carbonate, γ-butyrolactone, 1,2-dimethoxyethane, sulpholane, dioxolane, methyl propionate, or the like may be used. The solvents may be used alone or as a mixture of two or more kinds, and it is preferable to use a mixed solvent of two or more kinds, because the solute described below is easily dissolved and the lithium ion conductivity is high.

When the two or more kinds of the solvents are mixed, mixtures of one or more linear carbonates exemplified by dimethyl carbonate, methylethyl carbonate, diethyl carbonate, dipropyl carbonate, and methylpropyl carbonate, with one or more cyclic compounds exemplified by ethylene carbonate, propylene carbonate, butylene carbonate, and γ-butyrolactone are preferable, because the stability is high at a high temperature and the lithium conductivity is high at a low temperature. Mixtures of one or more linear carbonates exemplified by dimethyl carbonate, methylethyl carbonate, and diethyl carbonate, with one or more cyclic carbonates exemplified by ethylene carbonate, propylene carbonate, and butylene carbonate are particularly preferable.

A mixing ratio of the linear carbonate and the cyclic carbonate is preferably in a range of the linear carbonate: the cyclic carbonate=5% by volume:95% by volume to 95% by volume:5% by volume. When the content of the linear carbonate is less than 5% by volume, and the content of the cyclic carbonate is more than 95% by volume, desired battery characteristics, particularly a rate characteristic, may not be possibly obtained because of a too high viscosity of the nonaqueous solvent. On the other hand, when the content of the linear carbonate is more than 95% by volume and the content of the cyclic carbonate is less than 5% by volume, it is difficult to dissolve the solute described below in desired amount. The mixing ratio is more preferably in a range of the linear carbonate the cyclic carbonate=10% by volume:90% by volume to 90% by volume:10% by volume, because of the good balance between the desired viscosity and the amount of the solute, and is particularly preferably in a range of the linear carbonate the cyclic carbonate=20% by volume: 80% by volume to 80% by volume:20% by volume, because of the particularly good balance.

The solute is not particularly limited, and for example $LiClO_4$, $LiBF_4$, $LiPF_6$, $LiAsF_6$, $LiCF_3SO_3$, LiBOB (Lithium Bis (Oxalato) Borate), and $LiN(SO_2CF_3)_2$ are preferable because they are easily dissolved in the solvent. A concentration of the solute contained in the electrolytic solution is preferably 0.5 mol/L or more and 2.0 mol/L or less. When the concentration is less than 0.5 mol/L, a desired lithium ion conductivity may not sometimes be expressed. On the other hand, when it is more than 2.0 mol/L, the solute may not sometimes be dissolved any more.

The nonaqueous electrolyte in the present invention contains a compound selected from the group consisting of an organic compound having an oxalic acid backbone, an organic compound having an isocyanate group, a lithium salt of an organic compound having a sulfonic acid backbone, and a succinic anhydride compound having a side chain with 3 or more carbon atoms in a content of 0.01 to 5% by weight with respect to 100% by weight of the nonaqueous electrolyte.

The organic compound having an oxalic acid backbone is preferably a compound represented by the following general formula (1):

[C. 5]

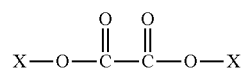

(1)

In the formula (1), X is an alkyl group having 1 to 6 carbon atoms, an alkenyl group having 2 to 6 carbon atoms, or an alkynyl group having 2 to 6 carbon atoms.

The alkyl group having 1 to 6 carbon atoms in the general formula (1) may include, for example, a methyl group, an ethyl group, a propyl group, a butyl group, a pentyl group, and a hexyl group. Of these, it is preferable to have 1 to 5, more preferably 1 to 4, carbon atoms, in terms of the improvement of the cycle stability and the effect of inhibiting the gas generation.

The alkenyl group having 2 to 6 carbon atoms in the general formula (1) may include, for example, a vinyl group, an allyl group, a 1-propene-1-yl group, a 2-butene-1-yl group, a 3-butene-1-yl group, a 4-pentene-1-yl group, a 5-hexene-1-yl group, a 1-propene-2-yl group, and a 3-methyl-2-butene-1-yl group. Of these, it is preferable to have 2 to 5, more preferably 2 to 4, carbon atoms, in terms of the improvement of the cycle stability and the effect of inhibiting the gas generation.

The alkynyl group having 2 to 6 carbon atoms in the general formula (1) may include, for example, an ethynyl group, a 2-propynyl group, a 3-butynyl group, and a 1-methyl-2-propynyl group. Of these, it is preferable to have 2 to 5, more preferably 3 to 5, carbon atoms, in terms of the improvement of the cycle stability and the effect of inhibiting the gas generation.

Of these, as the compound represented by the general formula (1) used in the nonaqueous electrolyte secondary battery of the present invention, di(2-propynyl)oxalate, di(1-methyl-2-propynyl)oxalate, di(2-butynyl)oxalate, di(3-butynyl)oxalate, di(1-methyl-2-butynyl)oxalate, di(1,1-dimethyl-2-propynyl)oxalate, and di(1,1-dimethyl-2-butynyl)oxalate are particularly preferable, because the effect of inhibiting the gas generation, and the effect of further increasing the charge final voltage compared to that conventionally obtained are particularly high by the combination of the negative electrode containing the titanium-containing oxide as the negative electrode active material with the positive electrode containing the spinel type lithium manganate, and the cobalt-containing compound and/or the lithium-transition metal composite oxide having the stratified rock salt type structure.

As the organic compound having an oxalic acid backbone, the compounds above may be used alone or as a combination of two or more kinds.

The organic compound having an isocyanate group is preferably a compound represented by the following general formula (2):

[C. 6]

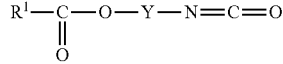

(2)

In the general formula (2), $R^1$ is a hydrogen atom, an alkyl group having 1 to 6 carbon atoms, an alkenyl group having 2 to 6 carbon atoms, an aryl group having 6 to 12 carbon atoms, an alkyloxy group having 1 to 6 carbon atoms, an alkenyloxy group having 2 to 6 carbon atoms, an isocyanatoalkyloxy group having 2 to 6 carbon atoms, or an aryloxy group having 6 to 12 carbon atoms. In the alkyl group, the alkenyl group, the aryl group, the alkyloxy group, the alkenyloxy group, the aryloxy group, and the isocyanatoalkyloxy group, at least one hydrogen atom may be substituted by a halogen atom.

Specific structures of the alkyl group having 1 to 6 carbon atoms, the alkenyl group having 2 to 6 carbon atoms, the aryl group having 6 to 12 carbon atoms, the alkyloxy group having 1 to 6 carbon atoms, the alkenyloxy group having 2 to 6 carbon atoms, and the isocyanatoalkyloxy group having 2 to 6 carbon atoms are as follows:

The alkyl group having 1 to 6 carbon atoms may include, for example, a methyl group, an ethyl group, a n-propyl group, a n-butyl group, a n-pentyl group, a n-hexyl group, a iso-propyl group, a sec-butyl group, a tert-butyl group, and the like.

The alkenyl group having 2 to 6 carbon atoms may include, for example, a vinyl group, an allyl group, a 1-propene-1-yl group, a 2-butene-1-yl group, a 3-butene-1-yl group, a 4-pentene-1-yl group, a 5-hexene-1-yl group, a 1-propene-2-yl group, a 3-methyt2-butene-1-yl group, and the like.

The aryl group having 6 to 12 carbon atoms may include, for example, a phenyl group, a 2-methylphenyl group, a 3-methylphenyl group, a 4-methylphenyl group, a 4-tert-butylphenyl group, a 2,4,6-trimethylphenyl group, a 2-fluorophenyl group, a 3-fluorophenyl group, a 4-fluorophenyl group, a 2,4-difluorophenyl group, a 2,6-difluorophenyl group, a 3,4-difluorophenyl group, a 2,4,6-trifluorophenyl group, a pentafluorophenyl group, a 4-trifluoromethylphenyl group, and the like.

The alkyloxy group having 1 to 6 carbon atoms may include a methoxy group, an ethoxy group, a propoxy group, and the like.

The alkenyloxy group having 2 to 6 carbon atoms may include a vinyloxy group, an allyloxy group, and the like.

The isocyanatoalkyloxy group having 2 to 6 carbon atoms may include an isocyanatoethyloxy group and the like.

The aryloxy group having 6 to 12 carbon atoms may include a phenyloxy group and the like.

As the $R^1$ in the general formula (2), the vinyl group, 1-propene-1-yl group, and 1-propene-2-yl group are preferable, because of the particularly good effects of inhibiting the gas generation and improving the cycle stability.

In the general formula (2), Y is an alkylene group having 1 to 6 carbon atoms in which at least one hydrogen atom may be substituted by a halogen atom, or a bivalent linking group having 2 to 6 carbon atoms and containing at least one ether bond.

The alkylene group having 1 to 6 carbon atoms may include a methylene group, an ethylene group, an n-propylene group, a n-butylene group, a n-pentylene group, a n-hexylene group, and the like.

The bivalent linking group having 2 to 6 carbon atoms and containing at least one ether bond may include —$(CH_2)_2$—O—, —$(CH_2)_3$—O—, —$(CH_2)_4$—O—, —$(CH_2)_5$—O—, —$(CH_2)_6$—O—, —$CH_2$—O—$CH_2$—, —$CH_2$—O—$(CH_2)_2$—, —$CH_2$—O—$(CH_2)_3$—, —$CH_2$—O—$(CH_2)_4$—, —$CH_2$—O—$(CH_2)_5$—, —$(CH_2)_2$—O—$(CH_2)_2$—, —$(CH_2)_2$—O—$(CH_2)_3$—, —$(CH_2)_3$—O—$(CH_2)_3$—, and the like.

Of these, the methylene group, ethylene group, and n-propylene group are preferable as Y in the general formula (2), because the effects of inhibiting the gas generation and improving the cycle stability are particularly good.

Of these, as the compound represented by the general formula (2) used in the nonaqueous electrolyte secondary battery of the present invention, 2-isocyanatoethyl acrylate, 2-isocyanatoethyl methacrylate, 2-isocyanatoethyl crotonate, 2-(2-isocyanatoethoxy)ethyl acrylate, 2-(2-isocyanatoethoxy)methacrylate, 2-(2-isocyanatoethoxy)ethyl crotonate, and bis(2-isocyanatoethyl)carbonate are preferable, because the effect of inhibiting the gas generation, and the effect of further increasing the charge final voltage compared to that conventionally obtained are particularly high by the combination of the negative electrode containing the titanium-containing oxide as the negative electrode active material with the positive electrode containing the spinel type lithium manganate, and the cobalt-containing compound and/or the lithium-transition metal composite oxide having the stratified rock salt type structure.

As the organic compound having an isocyanate group, the compounds above may be used alone or as a combination of two or more kinds.

The organic compound having a sulfonic acid backbone is preferably a compound represented by the following general formula (3):

[C. 7]

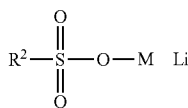

(3)

In the general formula (3), $R^2$ is an alkyl group having 1 to 6 carbon atoms. The alkyl group having 1 to 6 carbon atoms may include, for example, a methyl group, an ethyl group, a propyl group, a butyl group, a pentyl group, a hexyl group, and the like. Alkyl groups having 1 to 5 carbon atoms are preferable, and alkyl group having 1 to 3 carbon atoms are more preferable.

In the general formula (3), M is $BF_3$ or $PF_5$.

Of these, as the compound represented by the general formula (3) used in the nonaqueous electrolyte secondary battery of the present invention, it is preferable that $R^2$ is at least one group selected from the group consisting of the methyl group, ethyl group, and propyl group, and M is BF3, because the effect of inhibiting the gas generation, and the effect of further increasing the charge final voltage compared to that conventionally obtained are particularly high by the combination of the negative electrode containing the titanium-containing oxide as the negative electrode active material with the positive electrode containing the spinel type lithium manganate, and the cobalt-containing compound and/or the lithium-transition metal composite oxide having the stratified rock salt type structure.

As the organic compound having a sulfonic acid backbone, the compounds above may be used alone or as a combination of two or more kinds.

The succinic anhydride compound having a side chain with 3 or more carbon atoms is preferably a compound represented by the following general formula (4):

[C. 8]

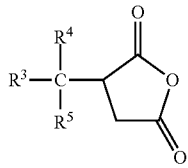

(4)

In the general formula (4), $R^3$ and $R^4$ are each independently a hydrogen atom, a halogen atom, or an alkyl group having 1 to 6 carbon atoms in which at least one hydrogen atom may be substituted by a halogen. $R^5$ is an alkenyl group having 2 to 4 carbon atoms and a double bond at the terminal, or an alkynyl group having 2 to 4 carbon atoms and a triple bond at the terminal.

The $R^3$ and $R^4$ are preferably the hydrogen atoms alone or the combination of the hydrogen atom and the alkyl group having 1 to 6 carbon atoms, and more preferably the hydrogen atoms alone or the combination of the hydrogen atom and the alkyl group having 1 to 3 carbon atoms, because of the good effects of inhibiting the gas generation and improving the cycle stability.

At that time, $R^5$ may be either the alkenyl group having 2 to 4 carbon atoms and a double bond at the terminal or the alkynyl group having 2 to 4 carbon atoms and a triple bond at the terminal. As the effect by the combination of $R^3$ and $R^4$ is high, $R^5$ is preferably the alkenyl group having 2 to 4 carbon atoms and a double bond at the terminal.

Specific structures of $R^5$ may include an allyl group, a 3-methylallyl group, a 3,3-dimethylallyl group, a 2-methylallyl group, a 2,3-dimethylallyl group, a 2,3,3-trimethylallyl group, a 2-propyne-1-yl group, a 1-methyl-2-propyne-1-yl group, a 1,2-dimethyl-2-propyne-1-yl group, and the like.

The specific compounds represented by the general formula (4) may preferably include, for example, 3-allyldihydrofuran-2,5-dione, 3-(3-methylallyl)dihydrofuran-2 5-dione, 3-(3,3-dimethylallyl)dihydrofuran-2,5-dione, 3-(2-methylallyl)dihydrofuran-2,5-dione, 3-(2,3-dimethylallyl) dihydrofuran-2,5-dione, 3-(2,3,3-trimethylallyl) diydrofuran-2,5-dione, 3-(2-propyne-1-yl)dihydrofuran-2,5-dione, 3-(1-methyl-2-propyne-1-yl)dihydrofuran-2,5-dione, and 3-(1,2-dimethyl-2-propyne-1-yl)dihydrofuran-2,5-dione.

Of these compounds, the compound represented by the general formula (4) used in the nonaqueous electrolyte secondary battery of the present invention is preferably 3-allyldihydrofuran-2,5-dione,3-(3-methylallyl)dihydrofuran-2,5-dione, 3-(3,3-dimethylallyl)dihydrofuran-2,5-dione, 3-(2-methylallyl)dihydrofuran-2,5-dione, 3-(2,3-dimethylallyl)dihydrofuran-2,5-dione, and 3-(2,3,3-trimethylallyl)dihydrofuran-2,5-dione, because the effect of inhibiting the gas generation, and the effect of further increasing the charge final voltage compared to that conventionally obtained are particularly high by the combination of the negative electrode containing the titanium-containing oxide as the negative electrode active material with the positive electrode containing the spinel type lithium manganate, and the cobalt-containing compound and/or the lithium-transition metal composite oxide having the stratified rock salt type structure.

As the succinic anhydride compound having a side chain with 3 or more carbon atoms, the compounds above may be used alone or as a combination of two or more kinds.

The one compound selected from the group consisting of the organic compound having an oxalic acid backbone, the organic compound having an isocyanate group, the lithium salt of an organic compound having a sulfonic acid backbone, and the succinic anhydride compound having a side chain with 3 or more carbon atoms is contained in a content of 0.01 to 5% by weight with respect to 100% by weight of the nonaqueous electrolyte. When the content is more than 5% by weight, the lithium ion conductivity is decreased due to the increased viscosity of the nonaqueous electrolyte itself, thus resulting in the possibility of the decrease of the battery characteristics, particularly the rate characteristic. On the other hand, when it is less than 0.01% by weight, a sufficient coating is not formed on the negative electrode side, and thus the gas generation, caused by the side reaction of the electrolytic solution with the negative electrode or the reaction of the decomposed product formed on the positive electrode side with the negative electrode, may not be possibly inhibited. The content is preferably from 0.02 to 4% by weight, more preferably from 0.05 to 3% by weight, because the balance in which the increase of the viscosity of the nonaqueous electrolyte itself is small, and the sufficient coating is formed on the negative electrode side is more excellent.

The nonaqueous electrolyte may be used as a gel electrolyte in which the nonaqueous electrolytic solution is impregnated in a polymer.

<5. Nonaqueous Electrolyte Secondary Battery>

The positive electrode and the negative electrode in the nonaqueous electrolyte secondary battery of the present invention may have a form in which the same electrodes are formed on both sides of the electric collector, or a form in which the positive electrode is formed on one side of the electric collector and the negative electrode is formed on the other side, i.e., may be a bipolar electrode.

The nonaqueous electrolyte secondary battery of the present invention may have a structure obtained. by disposing the separator between the positive electrode and the negative electrode, and winding it, or may be a laminate. The positive electrode, the negative electrode, and the separator contain a nonaqueous electrolyte bearing the lithium ion conductivity.

A ratio the electric capacity of the positive electrode to the electric capacity of the negative electrode in the nonaqueous electrolyte secondary battery of the present invention preferably satisfies the following formula (5).

$$1 \leq D/C \leq 1.2 \tag{5}$$

In the formula (5), C is an electric capacity per $cm^2$ of the positive electrode, and D is an electric capacity per $cm^2$ of the negative electrode.

When D/C is less than 1, the potential of the negative electrode may be equal to a deposition potential of lithium during the overcharge, and thus a risk in which the battery is short-circuited may be caused. On the other hand, when D/C is more than 1.2, excessive side reactions are advanced due to a large amount of negative electrode active materials, which do not participate in the battery reaction, and the gas generation may not be sometimes inhibited. even in the constituent of the present invention.

A ratio of an area of the positive electrode to an area of the negative electrode in the nonaqueous electrolyte secondary battery of the present invention is not particularly limited, and preferably satisfies the following formula (6):

$$1 \leq F/E \leq 1.2 \tag{6}$$

In the formula (6). E is an area of the positive electrode, and F is an area of the negative electrode.

When F/E is less than 1, for example in a case where D/C=1 as described above, a capacity of the negative electrode is smaller than that of the positive electrode, and thus the potential of the negative electrode may be equal to a deposition potential of lithium during the overcharge, thus resulting in the occurrence of the risk in which the battery is short-circuited. On the other hand, when F/E is more than 1.2, excessive side reactions are advanced due to a large amount of negative electrode active materials which do not participate in the battery reaction, caused by a large area of the negative electrode which does not face the positive electrode, and the gas generation may not be sometimes inhibited even in the constituent of the present invention. The areas of the positive electrode and the negative electrode are not particularly limited, and they can be controlled by control of a coated width of the active material layer of each electrode during coating of the slurry.

A ratio of an area of the separator to an area of the negative electrode used in the nonaqueous electrolyte secondary battery of the present invention is not particularly limited, and preferably satisfies the following formula (7):

$$1 \leq H/G \leq 1.5 \tag{7}$$

In the formula (7), G is an area of the negative electrode, and H is an area of the separator.

When H/G is less than 1, the positive electrode is brought into contact with the negative electrode to cause a short circuit, and it may not sometimes function as the battery. On the other hand, when H/G is more than 1.5, a volume necessary for outer packaging becomes large, and the output density of the battery may sometimes be decreased.

An amount of the nonaqueous electrolyte used in the nonaqueous electrolyte secondary battery of the present invention is not particularly limited, and is preferably 0.1 mL or more per Ah of the battery capacity. When the amount is less than 0.1 mL, the lithium ion conductivity cannot catch up with the electrode reaction, and a desired battery characteristic may not be sometimes expressed.

The nonaqueous electrolyte may be previously contained in the positive electrode, the negative electrode, and the separator, or may be added to the wound product or the laminate in which the separator is disposed between the positive electrode and the negative electrode.

In the nonaqueous electrolyte secondary battery of the present invention, the laminate described above is wound or the multiple laminates are laminated, and then the obtained product may be outer-packaged with a laminate film or a metallic can having a square, elliptical, cylindrical, coin, button, or sheet shape. The package may have a mechanism for releasing gas generated. With respect to the number of layers in the laminate, the layers may be laminated until a desired voltage and battery capacity are expressed.

A battery pack can be obtained from the nonaqueous electrolyte secondary battery of the present invention by connecting multiple batteries to each other. The battery pack of the present invention can be fabricated by suitably connecting them in series or in parallel depending on the desired size, capacity, and voltage. In order to confirm the state-of-charge and improve the safety, it is preferable to add a controlling circuit to the battery pack.

EXAMPLES

The present invention is explained in more detailed by means of Examples below. The present invention, however, is not limited to Examples, and appropriate variation can be made in a range in which the gist thereof is not changed.

Preparation Example 1 of Positive Electrode

As the positive electrode active material used for the positive electrode in Preparation Example 1, spinel type lithium manganate ($Li_{1.1}Al_{0.1}Mn_{1.8}O_4$), and lithium cobaltate ($LiCoO_2$) were used.

The spinel type lithium manganate ($Li_{1.1}Al_{0.1}Mn_{1.8}O_4$), lithium cobaltate ($LiCoO_2$), a conductive assistant (acetylene black), and a binder (PVdF) were mixed in amounts of, respectively, 99 parts by weight, 1 part by weight, 5 parts by weight, and 5 parts by weight in a solid concentration to prepare a mixed slurry. At that time, B/(A+B) is 0.01. As the binder, an N-methyl-2-pyrrolidone (NMP) solution having a solid concentration of 5% by weight was used, and to which NMP was further added to adjust a viscosity thereof, in order to easily coat it in the following step.

The slurry was coated on an aluminum foil (20 μm), which was dried in an oven at 120° C., and followed by vacuum drying at 170° C. to fabricate a positive electrode (50 cm$^2$).

A capacity of the positive electrode was measured by the following charge/discharge test.

In the same manner as described above, the electrode coated on one side of the aluminum foil was cut into a size of 16 mm Φ, which was used as a working electrode, and Li metal was cut into a size of 16 mm Φ, which was used as a counter electrode. Using these electrodes, the working electrode (one side coated), a separator, and Li metal were laminated in this order in a test cell (HS cell manufactured by Hohsen Corporation), into which 0.15 mL of nonaqueous electrolyte (ethylene carbonate/dimethyl carbonate=30/70% by volume, and 1 mol/L of LiPF$_6$) was poured to fabricate a half cell. After the half cell was allowed to stand at 25° C. for one day, it was connected to a charge/discharge testing device (HJ 1005 SD 8 manufactured by Hokuto Denko Corporation). A constant current charge (final voltage: 4.5 V) was applied to the half cell at 25° C. at 0.4 mA and then a constant current discharge (final voltage: 3.5 V) was conducted, this operation being repeated 5 times, and a result obtained at the fifth time was defined as a capacity of the positive electrode. As a result, the positive electrode had a capacity of 1.0 mAh/cm$^2$.

Preparation Example 2 of Positive Electrode

A positive electrode of Preparation Example 2 was fabricated in the same manner as in Preparation Example 1 except that the spinel type lithium manganate ($Li_{1.1}Al_{0.1}Mn_{1.8}O_4$), the lithium cobaltate ($LiCoO_2$), the conductive assistant (acetylene black), and the binder (PVdF) were mixed in amounts of, respectively, 96 parts by weight, 4 parts by weight, 5 parts by weight, and 5 parts by weight in a solid concentration to prepare a mixture. As a result, the positive electrode had a capacity of 1.0 mAh/cm$^2$. At that time, B/(A+B) is 0.04.

Preparation Example 3 of Positive Electrode

A positive electrode of Preparation Example 3 was fabricated in the same manner as in Preparation Example 1 except that the spinel type lithium manganate ($Li_{1.1}Al_{0.1}Mn_{1.8}O_4$), the lithium cobaltate ($LiCoO_2$), the conductive assistant (acetylene black), and the binder (PVdF) were mixed in amounts of, respectively, 90 parts by weight, 10 parts by weight, 5 parts by weight, and 5 parts by weight in a solid concentration to prepare a mixture. As a result, the positive electrode had a capacity of 1.0 mAh/cm$^2$. At that time, B/(A+B) is 0.10.

Preparation Example 4 of Positive Electrode

A positive electrode of Preparation Example 4 was fabricated in the same manner as in Preparation Example 1 except that the spinel type lithium manganate ($Li_{1.1}Al_{0.1}Mn_{1.8}O_4$), the lithium cobaltate ($LiCoO_2$), the conductive assistant (acetylene black), and the binder (PVdF) were mixed in amounts of, respectively, 85 parts by weight, 15 parts by weight, 5 parts by weight, and 5 parts by weight in a solid concentration to prepare a mixture. As a result, the positive electrode had a capacity of 1.0 mAh/cm$^2$. At that time, B/(A+B) is 0.15.

Preparation Example 5 of Positive Electrode

A positive electrode of Preparation Example 5 was fabricated in the same manner as in Preparation Example 1 except that cobalt oxide ($Co_3O_4$) was used instead of the lithium cobaltate. As a result, the positive electrode had a capacity of 1.0 mAh/cm$^2$. At that time, B/(A+B) is 0.01.

Preparation Example 6 of Positive Electrode

A positive electrode of Preparation Example 6 was fabricated in the same manner as in Preparation Example 2 except that cobalt oxide ($Co_3O_4$) was used instead of the lithium cobaltate. As a result, the positive electrode had a capacity of 1.0 mAh/cm$^2$. At that time, B/(A+B) is 0.04.

Preparation Example 7 of Positive Electrode

A positive electrode of Preparation Example 7 was fabricated in the same manner as in Preparation Example 3 except that cobalt oxide ($Co_3O_4$) was used instead of the lithium cobaltate. As a result, the positive electrode had a capacity of 1.0 mAh/cm$^2$. At that time, B/(A+B) is 0.10.

(Preparation Example 8 of Positive Electrode

A positive electrode of Preparation Example 8 was fabricated in the same manner as in Preparation Example 4 except that cobalt oxide ($Co_3O_4$) was used instead of the lithium cobaltate. As a result, the positive electrode had a capacity of 1.0 mAh/cm$^2$. At that time, B/(A+B) is 0.15.

Preparation Example 9 of Positive Electrode

A positive electrode of Preparation Example 9 was fabricated in the same manner as in Preparation Example 1 except that the spinel type lithium manganate ($Li_{1.1}Al_{0.1}Mn_{1.8}O_4$), the conductive assistant (acetylene black), and the binder (PVdF) were mixed in amounts of, respectively, 100 parts by weight, 5 parts by weight, and 5 parts by weight in a solid concentration to prepare a mixture. As a result, the positive electrode had a capacity of 1.0 mAh/cm$^2$. At that time, B/(A+B) is 0.

Preparation Example 10 of Positive Electrode

A positive electrode of Preparation Example 10 was fabricated in the same manner as in Preparation Example 5 except that a spinel type lithium manganate ($LiNi_{1/2}Mn_{3/2}O_4$) was used instead of the spinel type lithium manganate ($Li_{1.1}Al_{0.1}Mn_{1.8}O_4$), and the final voltage of the constant current charge was changed to 5.0 V. As a result, the positive electrode had a capacity of 1.0 mAh/cm$^2$. At that time, B/(A+B) is 0.01.

Preparation Example 11 of Positive Electrode

A positive electrode of Preparation Example 11 was fabricated in the same manner as in Preparation Example 6 except that the spinel type lithium manganate ($LiNi_{1/2}Mn_{3/2}O_4$) was used instead of the spinel type lithium manganate ($Li_{1.1}Al_{0.1}Mn_{1.8}O_4$), and the final voltage of the constant current charge was changed to 5.0 V. As a result, the positive electrode had a capacity of 1.0 mAh/cm$^2$. At that time, B/(A+B) is 0.04.

Preparation Example 12 of Positive Electrode

A positive electrode of Preparation Example 12 was fabricated in the same manner as in Preparation Example 7 except that the spinel type lithium manganate ($LiNi_{1/2}$ $Mn_{3/2}O_4$) was used instead of the spinel type lithium manganate ($Li_{1.1}Al_{0.1}Mn_{1.8}O_4$), and the final voltage of the constant current charge was changed to 5.0 V. As a result, the positive electrode had a capacity of 1.0 mAh/cm$^2$. At that time, B/(A+B) is 0.10.

Preparation Example 13 of Positive Electrode

A positive electrode of Preparation Example 13 was fabricated in the same manner as in Preparation Example 8 except that the spinel type lithium manganate ($LiNi_{1/2}Mn_{3/2}O_4$) was used instead of the spinel type lithium manganate ($Li_{1.1}Al_{0.1}Mn_{1.8}O_4$), and the final voltage of the constant current charge was changed to 5.0 V. As a result, the positive electrode had a capacity of 1.0 mAh/cm$^2$. At that time, B/(A+B) is 0.15.

Preparation Example 14 of Positive Electrode

A positive electrode of Preparation Example 14 was fabricated in the same manner as in Preparation Example 9 except that the spinel type lithium manganate ($LiNi_{1/2}Mn_{3/2}O_4$) was used instead of the spinel type lithium manganate ($Li_{1.1}Al_{0.1}Mn_{1.8}O_4$), and the final voltage of the constant current charge was changed to 5.0 V. As a result, the positive electrode had a capacity of 1.0 mAh/cm$^2$. At that time, B/(A+B) is 0.

Preparation Example of Negative Electrode

As the negative electrode active material, a spinel type lithium titanate ($Li_{4/3}Ti_{5/3}O_4$) was used. The negative electrode active material, a conductive assistant (acetylene black), and a binder (PVdF) were mixed in amounts of, respectively, 100 parts by weight, 5 parts by weight, and 5 parts by weight in a solid concentration to prepare a mixed slurry. As the binder, an NMP solution having a solid concentration of 5% by weight was used, and to which NMP was further added to adjust a viscosity thereof, in order to easily coat it in the following step. The slurry was coated on an aluminum foil (20 μm), which was dried in an oven at 120° C., and followed by vacuum drying at 170° C. to fabricate a negative electrode (50 cm$^2$).

A capacity of the negative electrode was measured by the following charge/discharge test.

In the same conditions as described above, the electrode was coated on one side of the aluminum foil, and it was cut into a size of 16 mm Φ to fabricate a working electrode. Li metal was cut into a size of 16 mm Φ, which was used as a counter electrode. Using these electrodes, the working electrode (one side coated), a separator, and Li metal were laminated in this order in a test cell (HS cell manufactured by Hohsen Corporation), into which 0.15 mL of nonaqueous electrolyte (ethylene carbonate/dimethyl carbonate=30/70% by volume, and 1 mol/L of LiPF6) was poured to fabricate a half cell. After the half cell was allowed to stand at 25° C. for one day, it was connected to the charge/discharge testing device (HJ 1005 SD 8 manufactured by Hokuto Denko Corporation). A constant current discharge (final voltage: 1.0 V) was applied to the half cell at 25° C. at 0.4 mA and then a constant current charge (final voltage: 2.0 V) was conducted, this operation being repeated 5 times, and a result obtained at the fifth time was defined as a capacity of the negative electrode. As a result, the negative electrode had a capacity of 1.2 mAh/cm$^2$.

Examples 1 to 108 and Comparative Examples 1 to 69

A nonaqueous electrolyte secondary battery was fabricated as follows:

As the electrodes, a positive electrode whose one side was coated and a negative electrode whose one side was coated, which were fabricated in the same manner as in Preparation Example described above, were used. As the separator, a cellulose non-woven fabric (25 μm, 55 cm$^2$) was used. First, the positive electrode (one side coated), the negative electrode (one side coated), which were fabricated as above, and the separator were laminated in the order of the positive electrode (one side coated)/the separator/the negative electrode (one side coated). Next, aluminum tabs were vibration welded to both ends of the positive electrode and the negative electrode, which was then put in a bag of an aluminum laminate sheet.

To nonaqueous electrolyte (ethylene carbonate/propylene carbonate/ethyl methyl carbonate=15/15/70% by volume, and 1 mol/L of LiPF$_6$) was added any one kind of a compound shown in Table 1 to obtain nonaqueous electrolyte. As shown in Table 1, compound 1-1, compound 1-2, or compound 1-3 was used as the organic compound having an oxalic acid backbone; compound 2-1, compound 2-2, or compound 2-3 was used as the organic compound having an isocyanate group; compound 3-1, compound 3-2, or compound 3-3 was used as the organic compound having a sulfonic acid backbone; and compound 4-1, compound 4-2, or compound 4-3 was used as the succinic anhydride compound having a side chain with 3 or more carbon atoms. A content of each compound was adjusted to 0.1% by weight for compound 1-1, compound 1-2, and compound 1-3; 0.5% by weight for compound 2-1, compound 2-2, and compound 2-3; 1.0% by weight for compound 3-1, compound 3-2, and compound 3-3; and 1.0% by weight for compound 4-1, compound 4-2, and compound 4-3.

TABLE 1

| | Compound name |
|---|---|
| Compound 1-1 | di(2-propynyl)oxalate |
| Compound 1-2 | di(2-butynyl)oxalate |
| Compound 1-3 | di(3-butynyl)oxalate |
| Compound 2-1 | 2-isocyanatoethyl acrylate |
| Compound 2-2 | 2-isocyanatoethyl methacrylate |
| Compound 2-3 | 2-isocyanatoethyl crotonate |
| Compound 3-1 | $CH_3-\underset{\underset{O}{\|}}{\overset{\overset{O}{\|}}{S}}-O-BF_3Li$ |
| Compound 3-2 | $CH_3-CH_2-\underset{\underset{O}{\|}}{\overset{\overset{O}{\|}}{S}}-O-BF_3Li$ |
| Compound 3-3 | $CH_3-CH_2-CH_2-\underset{\underset{O}{\|}}{\overset{\overset{O}{\|}}{S}}-O-BF_3Li$ |
| Compound 4-1 | 3-allyldihydrofuran-2,5-dione |
| Compound 4-2 | 3-(3-methylallyl)dihydrofuran-2,5-dione |
| Compound 4-3 | 3-(3,3-dimethylallyl)dihydrofuran-2,5-dione |

The nonaqueous electrolyte secondary batteries of Examples 1 to 108 and Comparative Examples 1 to 69 were fabricated so as to have a combination of the positive electrode, the negative electrode, and the nonaqueous electrolyte to which the compound was added, shown in Table 2.

TABLE 2

Positive electrode: A = $Li_{1.1}Al_{0.1}Mn_{1.8}O_4$, B = $LiCoO_2$
Negative electrode: lithium titanate
Blending ratio: B/(A + B)

|  | 0.01 (Preparation Example 1) | 0.04 (Preparation Example 2) | 0.10 (Preparation Example 3) | 0.15 (Preparation Example 4) | 0.00 (Preparation Example 9) |
|---|---|---|---|---|---|
| Compound 1-1 | Example 1 | Example 13 | Example 25 | Comparative Example 1 | Comparative Example 13 |
| Compound 1-2 | Example 2 | Example 14 | Example 26 | Comparative Example 2 | Comparative Example 14 |
| Compound 1-3 | Example 3 | Example 15 | Example 27 | Comparative Example 3 | Comparative Example 15 |
| Compound 2-1 | Example 4 | Example 16 | Example 28 | Comparative Example 4 | Comparative Example 16 |
| Compound 2-2 | Example 5 | Example 17 | Example 29 | Comparative Example 5 | Comparative Example 17 |
| Compound 2-3 | Example 6 | Example 18 | Example 30 | Comparative Example 6 | Comparative Example 18 |
| Compound 3-1 | Example 7 | Example 19 | Example 31 | Comparative Example 7 | Comparative Example 19 |
| Compound 3-2 | Example 8 | Example 20 | Example 32 | Comparative Example 8 | Comparative Example 20 |
| Compound 3-3 | Example 9 | Example 21 | Example 33 | Comparative Example 9 | Comparative Example 21 |
| Compound 4-1 | Example 10 | Example 22 | Example 34 | Comparative Example 10 | Comparative Example 22 |
| Compound 4-2 | Example 11 | Example 23 | Example 35 | Comparative Example 11 | Comparative Example 23 |
| Compound 4-3 | Example 12 | Example 24 | Example 36 | Comparative Example 12 | Comparative Example 24 |
| No Compound | Comparative Example 25 | Comparative Example 26 | Comparative Example 27 | | |

Positive electrode: A = $Li_{1.1}Al_{0.1}Mn_{1.8}O_4$, B = $Co_3O_4$
Negative electrode: lithium titanate
Blending ratio: B/(A + B)

|  | 0.01 (Preparation Example 5) | 0.04 (Preparation Example 6) | 0.10 (Preparation Example 7) | 0.15 (Preparation Example 8) | 0.00 |
|---|---|---|---|---|---|
| Compound 1-1 | Example 37 | Example 49 | Example 61 | Comparative Example 28 | |
| Compound 1-2 | Example 38 | Example 50 | Example 62 | Comparative Example 29 | |
| Compound 1-3 | Example 39 | Example 51 | Example 63 | Comparative Example 30 | |
| Compound 2-1 | Example 40 | Example 52 | Example 64 | Comparative Example 31 | |
| Compound 2-2 | Example 41 | Example 53 | Example 65 | Comparative Example 32 | |
| Compound 2-3 | Example 42 | Example 54 | Example 66 | Comparative Example 33 | |
| Compound 3-1 | Example 43 | Example 55 | Example 67 | Comparative Example 34 | |
| Compound 3-2 | Example 44 | Example 56 | Example 68 | Comparative Example 35 | |
| Compound 3-3 | Example 45 | Example 57 | Example 69 | Comparative Example 36 | |
| Compound 4-1 | Example 46 | Example 58 | Example 70 | Comparative Example 37 | |
| Compound 4-2 | Example 47 | Example 59 | Example 71 | Comparative Example 38 | |
| Compound 4-3 | Example 48 | Example 60 | Example 72 | Comparative Example 39 | |
| No Compound | Comparative Example 40 | Comparative Example 41 | Comparative Example 42 | | |

TABLE 2-continued

Positive electrode: A = LiNi$_{1/2}$Mn$_{3/2}$O$_4$, B = Co$_3$O$_4$
Negative electrode: lithium titanate
Blending ratio: B/(A + B)

| | 0.01 (Preparation Example 10) | 0.04 (Preparation Example 11) | 0.10 (Preparation Example 12) | 0.15 (Preparation Example 13) | 0.00 (Preparation Example 14) |
|---|---|---|---|---|---|
| Compound 1-1 | Example 73 | Example 85 | Example 97 | Comparative Example 43 | Comparative Example 55 |
| Compound 1-2 | Example 74 | Example 86 | Example 98 | Comparative Example 44 | Comparative Example 56 |
| Compound 1-3 | Example 75 | Example 87 | Example 99 | Comparative Example 45 | Comparative Example 57 |
| Compound 2-1 | Example 76 | Example 88 | Example 100 | Comparative Example 46 | Comparative Example 58 |
| Compound 2-2 | Example 77 | Example 89 | Example 101 | Comparative Example 47 | Comparative Example 59 |
| Compound 2-3 | Example 78 | Example 90 | Example 102 | Comparative Example 48 | Comparative Example 60 |
| Compound 3-1 | Example 79 | Example 91 | Example 103 | Comparative Example 49 | Comparative Example 61 |
| Compound 3-2 | Example 80 | Example 92 | Example 104 | Comparative Example 50 | Comparative Example 62 |
| Compound 3-3 | Example 81 | Example 93 | Example 105 | Comparative Example 51 | Comparative Example 63 |
| Compound 4-1 | Example 82 | Example 94 | Example 106 | Comparative Example 52 | Comparative Example 64 |
| Compound 4-2 | Example 83 | Example 95 | Example 107 | Comparative Example 53 | Comparative Example 65 |
| Compound 4-3 | Example 84 | Example 96 | Example 108 | Comparative Example 54 | Comparative Example 66 |
| No Compound | Comparative Example 67 | Comparative Example 68 | Comparative Example 69 | | |

<Evaluation of Cycle Characteristic of Nonaqueous Electrolyte Secondary Battery>

The nonaqueous electrolyte secondary battery from each of Examples 1 to 108 and Comparative Examples 1 to 69 was connected to the charge/discharge testing device (HJ 1005 SD 8 manufactured by Hokuto Denko Corporation). An operating cycle was performed after an aging step, an amount of gas generated and a capacity retention were measured, and the cycle characteristic was evaluated.

(Evaluation of Amount of Gas Generated of Nonaqueous Electrolyte Secondary Battery)

The amount of gas generated of the nonaqueous electrolyte secondary battery from each of Examples 1 to 108 and Comparative Examples 1 to 69 was evaluated by an Archimedes method, i.e., a method using a buoyancy of the nonaqueous electrolyte secondary battery. The evaluation was performed as follows:

First, a weight of the nonaqueous electrolyte secondary battery was measured using an electronic balance, prior to the operating cycle. Next, a weight thereof in water was measured using a hydrometer (Parts No. MDS-3000 manufactured by Alfa Mirage Co., Ltd.), and the buoyancy was calculated by the difference between the two weights. A volume of the nonaqueous electrolyte secondary battery was calculated by dividing the buoyancy by a density of water (1.0 g/cm$^3$). An amount of gas generated by the operating cycle was calculated by comparing the volumes before and after the cycle characteristic (capacity retention) measurement described below. In the criteria of the amount of gas generated, good means that the amount was less than 0.2 mL, and inferior means that the amount was 0.2 mL or more.

(Aging)

The aging was performed in a manner in which each nonaqueous electrolyte secondary battery was full charged (2.7 V in Examples 1 to 72 and Comparative Examples 1 to 42, and 3.5 V in Examples 73 to 108 and Comparative Examples 43 to 69), and then it was allowed to stand at 60° C. for 168 hours. After that, it was cooled to room temperature (25° C.), then gases generated were removed, and it was sealed again while the pressure was reduced.

(Capacity Retention)

After the aging, an operation of a 25 mA constant current charge and 50 mA constant current discharge was repeated 500 times at 60° C. At that time, the charge final voltage and the discharge final voltage were adjusted to 2.7 V and 2.0 V, respectively, in Examples 1 to 72 and Comparative Examples 1 to 42, and the charge final voltage and the discharge final voltage were adjusted to 3.4 V and 2.5 V, respectively, in Examples 73 to 108 and Comparative Examples 43 to 69. A retention of the discharge capacity at the 500th time was evaluated supposing the discharge capacity at the first time was 100.

(Stability of Cycle Characteristic)

The stability of the cycle characteristic was evaluated by the evaluation of the amount of gas generated and the retention of the discharge capacity at the 500th time supposing the discharge capacity at the first time is 100. In the criteria, good means that the evaluation of the amount of gas generated was good and the capacity retention was 80% or more, and inferior means that the capacity retention was less than 80%.

The results are shown in Table 3-1, Table 3-2, Table4-1, Table 4-2, Table 5-1, and Table 5-2.

TABLE 3-1

|  | Amount of gas generated/mL | Evaluation of amount of gas generated | Capacity retention/% | Stability of cycle characteristic |
| --- | --- | --- | --- | --- |
| Example 1 | 0.00 | good | 85 | good |
| Example 2 | 0.03 | good | 84 | good |
| Example 3 | 0.03 | good | 83 | good |
| Example 4 | 0.02 | good | 81 | good |
| Example 5 | 0.02 | good | 86 | good |
| Example 6 | 0.04 | good | 81 | good |
| Example 7 | 0.03 | good | 84 | good |
| Example 8 | 0.02 | good | 83 | good |
| Example 9 | 0.03 | good | 84 | good |
| Example 10 | 0.02 | good | 81 | good |
| Example 11 | 0.03 | good | 81 | good |
| Example 12 | 0.04 | good | 82 | good |
| Example 13 | 0.00 | good | 91 | good |
| Example 14 | 0.00 | good | 90 | good |
| Example 15 | 0.00 | good | 92 | good |
| Example 16 | 0.02 | good | 90 | good |
| Example 17 | 0.03 | good | 93 | good |
| Example 18 | 0.02 | good | 90 | good |
| Example 19 | 0.01 | good | 90 | good |
| Example 20 | 0.02 | good | 91 | good |
| Example 21 | 0.00 | good | 91 | good |
| Example 22 | 0.03 | good | 91 | good |
| Example 23 | 0.02 | good | 93 | good |
| Example 24 | 0.02 | good | 90 | good |
| Example 25 | 0.04 | good | 85 | good |
| Example 26 | 0.05 | good | 86 | good |
| Example 27 | 0.03 | good | 84 | good |
| Example 28 | 0.04 | good | 83 | good |
| Example 29 | 0.05 | good | 85 | good |
| Example 30 | 0.03 | good | 85 | good |
| Example 31 | 0.04 | good | 86 | good |
| Example 32 | 0.04 | good | 82 | good |
| Example 33 | 0.05 | good | 84 | good |
| Example 34 | 0.03 | good | 84 | good |
| Example 35 | 0.04 | good | 85 | good |
| Example 36 | 0.03 | good | 83 | good |

TABLE 4-1

|  | Amount of gas generated/mL | Evaluation of amount of gas generated | Capacity retention/% | Stability of cycle characteristic |
| --- | --- | --- | --- | --- |
| Example 37 | 0.06 | good | 82 | good |
| Example 38 | 0.07 | good | 85 | good |
| Example 39 | 0.06 | good | 84 | good |
| Example 40 | 0.07 | good | 84 | good |
| Example 41 | 0.07 | good | 84 | good |
| Example 42 | 0.08 | good | 85 | good |
| Example 43 | 0.06 | good | 85 | good |
| Example 44 | 0.07 | good | 81 | good |
| Example 45 | 0.07 | good | 85 | good |
| Example 46 | 0.08 | good | 82 | good |
| Example 47 | 0.08 | good | 83 | good |
| Example 48 | 0.08 | good | 85 | good |
| Example 49 | 0.09 | good | 92 | good |
| Example 50 | 0.10 | good | 93 | good |
| Example 51 | 0.09 | good | 93 | good |
| Example 52 | 0.08 | good | 90 | good |
| Example 53 | 0.08 | good | 93 | good |
| Example 54 | 0.09 | good | 92 | good |
| Example 55 | 0.07 | good | 92 | good |
| Example 56 | 0.07 | good | 92 | good |
| Example 57 | 0.07 | good | 91 | good |
| Example 58 | 0.09 | good | 93 | good |
| Example 59 | 0.09 | good | 90 | good |
| Example 60 | 0.09 | good | 93 | good |
| Example 61 | 0.10 | good | 86 | good |
| Example 62 | 0.10 | good | 86 | good |
| Example 63 | 0.07 | good | 81 | good |
| Example 64 | 0.07 | good | 83 | good |
| Example 65 | 0.08 | good | 81 | good |
| Example 66 | 0.08 | good | 85 | good |
| Example 67 | 0.08 | good | 84 | good |
| Example 68 | 0.09 | good | 85 | good |
| Example 69 | 0.09 | good | 84 | good |
| Example 70 | 0.07 | good | 83 | good |
| Example 71 | 0.08 | good | 82 | good |
| Example 72 | 0.07 | good | 81 | good |

TABLE 3-2

|  | Amount of gas generated/mL | Evaluation of amount of gas generated | Capacity retention/% | Stability of cycle characteristic |
| --- | --- | --- | --- | --- |
| Comparative Example 1 | 0.05 | good | 74 | inferior |
| Comparative Example 2 | 0.04 | good | 73 | inferior |
| Comparative Example 3 | 0.04 | good | 75 | inferior |
| Comparative Example 4 | 0.06 | good | 75 | inferior |
| Comparative Example 5 | 0.04 | good | 76 | inferior |
| Comparative Example 6 | 0.02 | good | 75 | inferior |
| Comparative Example 7 | 0.06 | good | 74 | inferior |
| Comparative Example 8 | 0.04 | good | 76 | inferior |
| Comparative Example 9 | 0.03 | good | 75 | inferior |
| Comparative Example 10 | 0.03 | good | 75 | inferior |
| Comparative Example 11 | 0.04 | good | 71 | inferior |
| Comparative Example 12 | 0.05 | good | 74 | inferior |
| Comparative Example 13 | 0.52 | inferior | 65 | inferior |
| Comparative Example 14 | 0.55 | inferior | 63 | inferior |
| Comparative Example 15 | 0.45 | inferior | 59 | inferior |
| Comparative Example 16 | 0.60 | inferior | 55 | inferior |
| Comparative Example 17 | 0.47 | inferior | 58 | inferior |
| Comparative Example 18 | 0.61 | inferior | 60 | inferior |
| Comparative Example 19 | 0.58 | inferior | 63 | inferior |
| Comparative Example 20 | 0.54 | inferior | 64 | inferior |
| Comparative Example 21 | 0.49 | inferior | 69 | inferior |
| Comparative Example 22 | 0.55 | inferior | 63 | inferior |
| Comparative Example 23 | 0.48 | inferior | 61 | inferior |
| Comparative Example 24 | 0.45 | inferior | 62 | inferior |
| Comparative Example 25 | 0.30 | inferior | 61 | inferior |
| Comparative Example 26 | 0.32 | inferior | 76 | inferior |
| Comparative Example 27 | 0.29 | inferior | 59 | inferior |

TABLE 4-2

|  | Amount of gas generated/mL | Evaluation of amount of gas generated | Capacity retention/% | Stability of cycle characteristic |
|---|---|---|---|---|
| Comparative Example 28 | 0.08 | good | 71 | inferior |
| Comparative Example 29 | 0.09 | good | 71 | inferior |
| Comparative Example 30 | 0.07 | good | 72 | inferior |
| Comparative Example 31 | 0.08 | good | 74 | inferior |
| Comparative Example 32 | 0.06 | good | 74 | inferior |
| Comparative Example 33 | 0.07 | good | 72 | inferior |
| Comparative Example 34 | 0.07 | good | 74 | inferior |
| Comparative Example 35 | 0.07 | good | 72 | inferior |
| Comparative Example 36 | 0.07 | good | 72 | inferior |
| Comparative Example 37 | 0.09 | good | 71 | inferior |
| Comparative Example 38 | 0.08 | good | 72 | inferior |
| Comparative Example 39 | 0.08 | good | 71 | inferior |
| Comparative Example 40 | 0.41 | inferior | 59 | inferior |
| Comparative Example 41 | 0.44 | inferior | 77 | inferior |
| Comparative Example 42 | 0.41 | inferior | 63 | inferior |

TABLE 5-1

|  | Amount of gas generated/mL | Evaluation of amount of gas generated | Capacity retention/% | Stability of cycle characteristic |
|---|---|---|---|---|
| Example 73 | 0.17 | good | 84 | good |
| Example 74 | 0.18 | good | 84 | good |
| Example 75 | 0.19 | good | 83 | good |
| Example 76 | 0.13 | good | 84 | good |
| Example 77 | 0.12 | good | 83 | good |
| Example 78 | 0.13 | good | 82 | good |
| Example 79 | 0.14 | good | 81 | good |
| Example 80 | 0.15 | good | 85 | good |
| Example 81 | 0.15 | good | 84 | good |
| Example 82 | 0.16 | good | 83 | good |
| Example 83 | 0.16 | good | 83 | good |
| Example 84 | 0.14 | good | 84 | good |
| Example 85 | 0.15 | good | 93 | good |
| Example 86 | 0.15 | good | 93 | good |
| Example 87 | 0.16 | good | 91 | good |
| Example 88 | 0.14 | good | 93 | good |
| Example 89 | 0.18 | good | 93 | good |
| Example 90 | 0.19 | good | 91 | good |
| Example 91 | 0.19 | good | 90 | good |
| Example 92 | 0.15 | good | 91 | good |
| Example 93 | 0.14 | good | 91 | good |
| Example 94 | 0.15 | good | 93 | good |
| Example 95 | 0.15 | good | 94 | good |
| Example 96 | 0.17 | good | 91 | good |
| Example 97 | 0.16 | good | 84 | good |
| Example 98 | 0.15 | good | 84 | good |
| Example 99 | 0.15 | good | 84 | good |
| Example 100 | 0.16 | good | 81 | good |
| Example 101 | 0.15 | good | 81 | good |
| Example 102 | 0.17 | good | 81 | good |
| Example 103 | 0.15 | good | 82 | good |
| Example 104 | 0.15 | good | 83 | good |
| Example 105 | 0.14 | good | 81 | good |
| Example 106 | 0.13 | good | 82 | good |
| Example 107 | 0.13 | good | 83 | good |
| Example 108 | 0.13 | good | 81 | good |

TABLE 5-2

|  | Amount of gas generated/mL | Evaluation of amount of gas generated | Capacity retention/% | Stability of cycle characteristic |
|---|---|---|---|---|
| Comparative Example 43 | 0.15 | good | 71 | inferior |
| Comparative Example 44 | 0.18 | good | 72 | inferior |
| Comparative Example 45 | 0.16 | good | 71 | inferior |
| Comparative Example 46 | 0.17 | good | 73 | inferior |
| Comparative Example 47 | 0.17 | good | 71 | inferior |
| Comparative Example 48 | 0.15 | good | 72 | inferior |
| Comparative Example 49 | 0.16 | good | 71 | inferior |
| Comparative Example 50 | 0.16 | good | 71 | inferior |
| Comparative Example 51 | 0.15 | good | 70 | inferior |
| Comparative Example 52 | 0.16 | good | 74 | inferior |
| Comparative Example 53 | 0.16 | good | 70 | inferior |
| Comparative Example 54 | 0.14 | good | 70 | inferior |
| Comparative Example 55 | 2.15 | inferior | 45 | inferior |
| Comparative Example 56 | 2.22 | inferior | 58 | inferior |
| Comparative Example 57 | 2.31 | inferior | 48 | inferior |
| Comparative Example 58 | 2.31 | inferior | 56 | inferior |
| Comparative Example 59 | 1.89 | inferior | 58 | inferior |
| Comparative Example 60 | 1.99 | inferior | 44 | inferior |
| Comparative Example 61 | 1.78 | inferior | 60 | inferior |
| Comparative Example 62 | 1.89 | inferior | 61 | inferior |
| Comparative Example 63 | 1.56 | inferior | 56 | inferior |
| Comparative Example 64 | 1.59 | inferior | 46 | inferior |
| Comparative Example 65 | 1.69 | inferior | 66 | inferior |
| Comparative Example 66 | 1.66 | inferior | 58 | inferior |
| Comparative Example 67 | 0.54 | inferior | 59 | inferior |

TABLE 5-2-continued

|  | Amount of gas generated/mL | Evaluation of amount of gas generated | Capacity retention/% | Stability of cycle characteristic |
|---|---|---|---|---|
| Comparative Example 68 | 0.56 | inferior | 75 | inferior |
| Comparative Example 69 | 0.45 | inferior | 57 | inferior |

In the cells from Examples 1 to 108, expanding and loosening caused by the gas generation were not observed and it was confirmed that they had good cycle stability. On the other hand, in Comparative Examples 1 to 69, it was shown that the cycle stability was lower than that obtained in Examples, and further the expanding and loosening of the cells, caused by the gas generation, were observed when the positive electrodes had B/(A+B) of 0.00 or the compound specified in the present invention was not contained in the nonaqueous electrolyte.

These results can be considered that, in Examples 1 to 108, the lithium cobaltate or cobalt oxide contained in the positive electrode absorbed the gas, generated in both of the reaction of the spinel type lithium titanate with the nonaqueous electrolyte at the negative electrode and the reaction of the spinel type lithium manganate with the electrolytic solution at the positive electrode; and the reaction of the spinel type lithium titanate with the nonaqueous electrolyte or the reaction of the spinel type lithium manganate with the nonaqueous electrolyte, and the reaction of the lithium cobaltate or the cobalt oxide with the nonaqueous electrolyte can be inhibited by the formation of the coating, formed from any one of the compounds 1-1 to 4-3, on the negative electrode or the positive electrode; and the gas generation can be inhibited by the synergistic effect thereof.

In addition, Examples 1 to 36 in which the positive electrode contains the lithium cobaltate, the amount of gas generated is smaller than that in Examples 37 to 108 in which the positive electrode contains the cobalt oxide. This can be considered that hydrogen, once trapped in the layer of the lithium cobaltate, stays therein, different from the lithium ions ($Li^+$) released during the charging, and it maintains the layer structure of the lithium cobaltate, instead. of the lithium ions ($Li^+$) released, during which the coating is formed on the negative electrode or the positive electrode; as a result, the generation and the absorption of hydrogen are well-balanced at the initial stage and the gas generation is inhibited. It is understood, accordingly, that the case in which the positive electrode contains the lithium-transition metal composite oxide having the stratified rock salt type structure such as lithium cobaltate is more preferable than the case it contains the cobalt-containing compound (cobalt compound containing no Li).

With respect to Comparative Examples 1 to 12, 28 to 39, and 43 to 54, although the effect of inhibiting the gas generation was observed, a desired cycle characteristic could not be obtained. The lithium cobaltate and the cobalt oxide had a larger change in the expanding and contraction than that of the spinel type lithium manganate, and thus the deterioration with the progress of cycles is large. From this, it can be considered that when the positive electrode contains a given amount or more of the lithium cobaltate or cobalt oxide, the influence caused by the compound is greatly expressed.

With respect to Comparative Examples 13 to 24 and 55 to 66, the effect of inhibiting the gas generation was not observed, and the cycle characteristic was also decreased. This can be considered that the positive electrode did not contain the lithium cobaltate or the cobalt oxide, and thus the gas amount, generated during the operating cycle, could not be absorbed.

With respect to Comparative Examples 25 to 27, 40 to 42, and 67 to 69, the nonaqueous electrolyte did not contain any of the compounds 1-1 to 4-3, the coating was not formed on the negative electrode or the positive electrode, and thus the reaction of the spinel type lithium titanate with the nonaqueous electrolyte at the negative electrode or the reaction of the spinel type lithium manganate and the nonaqueous electrolyte at the positive electrode, and the reaction of the lithium cobaltate or the cobalt oxide contained in the positive electrode with the nonaqueous electrolyte could not be inhibited, thus resulting in the gas generation.

<Evaluation of Charging Rate Characteristic of Nonaqueous Electrolyte Secondary Battery>

The nonaqueous electrolyte secondary battery from each of Examples 1 to 108 and Comparative Examples 1 to 69 was connected to the charge/discharge testing device (HJ 1005 SD 8 manufactured by Hokuto Denko Corporation), which was subjected to the aging step, and then the rate characteristic was evaluated.

(Evaluation of Amount of Gas Generated of Nonaqueous Electrolyte Secondary Battery)

In the evaluation of the amount of gas generated of the nonaqueous electrolyte secondary battery from each of Examples 1 to 108 and Comparative Examples 1 to 69, an amount of gas generated after the charging rate characteristic (capacity retention) measurement, described below, was calculated by comparing the volumes before and after the charging rate characteristic measurement in the same manner as in the evaluation of the cycle characteristic. In the criteria of the amount of gas generated, good means that the amount was less than 0.2 mL, and inferior means that the amount was 0.2 mL or more.

(Aging)

The aging was performed in a manner in which each nonaqueous electrolyte secondary battery was full charged (2.7 V in Examples1 to 72 and Comparative Examples 1 to 42, and 3.5V in Examples 73 to 108 and Comparative Examples 43 to 69), and then it was allowed to stand at 60° C. for 168 hours. After that, it was cooled to room temperature (25° C.), then gases generated were removed, and it was sealed again while the pressure was reduced.

(Capacity Retention)

After the aging, a low charging rate characteristic was measured by repeating an operation of 25 mA constant current charge and 25 mA constant current discharge 5 times at 25° C., and a high charging rate characteristic was measured by repeating an operation of 250 mA constant current charge and 25 mA constant current discharge 5 times at 25° C. At that time, the charge final voltage and the discharge final voltage were adjusted to 3.0 V and 2.0 V, respectively, in Examples 1 to 72 and Comparative Examples 1 to 42, and the charge final voltage and the discharge final voltage were adjusted to 3.7 V and 2.5 V, respectively, in Examples 73 to 108 and Comparative Examples 43 to 69. A retention of the charge capacity of the high charging rate characteristic at the fifth time was evaluated supposing the charge capacity of the low charging rate characteristic at the fifth time was 100.

(Charging Rate Characteristic)

In the evaluation of the charging rate characteristic, good means that the evaluation of the amount of gas generated was good and the charge capacity retention was 60% or more, and inferior means that the charge capacity retention was less than 60%.

The results are shown in Table 6-1, Table 6-2, Table 7-1, Table 7-2, Table 8-1, and Table 8-2.

TABLE 6-1

|  | Amount of gas generated/ mL | Evaluation of amount of gas generated | Capacity retention/% | Charging rate characteristic |
|---|---|---|---|---|
| Example 1 | 0.00 | good | 62 | good |
| Example 2 | 0.00 | good | 66 | good |
| Example 3 | 0.01 | good | 61 | good |
| Example 4 | 0.00 | good | 64 | good |
| Example 5 | 0.00 | good | 65 | good |
| Example 6 | 0.00 | good | 66 | good |
| Example 7 | 0.01 | good | 63 | good |
| Example 8 | 0.01 | good | 63 | good |
| Example 9 | 0.02 | good | 62 | good |
| Example 10 | 0.00 | good | 65 | good |
| Example 11 | 0.01 | good | 64 | good |

TABLE 6-1-continued

|  | Amount of gas generated/ mL | Evaluation of amount of gas generated | Capacity retention/% | Charging rate characteristic |
|---|---|---|---|---|
| Example 12 | 0.01 | good | 65 | good |
| Example 13 | 0.00 | good | 72 | good |
| Example 14 | 0.02 | good | 75 | good |
| Example 15 | 0.01 | good | 71 | good |
| Example 16 | 0.00 | good | 73 | good |
| Example 17 | 0.00 | good | 71 | good |
| Example 18 | 0.00 | good | 70 | good |
| Example 19 | 0.01 | good | 76 | good |
| Example 20 | 0.02 | good | 74 | good |
| Example 21 | 0.01 | good | 71 | good |
| Example 22 | 0.00 | good | 75 | good |
| Example 23 | 0.00 | good | 73 | good |
| Example 24 | 0.00 | good | 74 | good |
| Example 25 | 0.00 | good | 64 | good |
| Example 26 | 0.00 | good | 66 | good |
| Example 27 | 0.01 | good | 63 | good |
| Example 28 | 0.01 | good | 63 | good |
| Example 29 | 0.01 | good | 65 | good |
| Example 30 | 0.01 | good | 63 | good |
| Example 31 | 0.02 | good | 64 | good |
| Example 32 | 0.00 | good | 65 | good |
| Example 33 | 0.02 | good | 62 | good |
| Example 34 | 0.01 | good | 62 | good |
| Example 35 | 0.00 | good | 63 | good |
| Example 36 | 0.00 | good | 66 | good |

TABLE 6-2

|  | Amount of gas generated/mL | Evaluation of amount of gas generated | Capacity retention/% | Charging rate characteristic |
|---|---|---|---|---|
| Comparative Example 1 | 0.63 | inferior | 31 | inferior |
| Comparative Example 2 | 0.61 | inferior | 32 | inferior |
| Comparative Example 3 | 0.55 | inferior | 39 | inferior |
| Comparative Example 4 | 0.58 | inferior | 38 | inferior |
| Comparative Example 5 | 0.56 | inferior | 40 | inferior |
| Comparative Example 6 | 0.61 | inferior | 39 | inferior |
| Comparative Example 7 | 0.58 | inferior | 40 | inferior |
| Comparative Example 8 | 0.56 | inferior | 42 | inferior |
| Comparative Example 9 | 0.61 | inferior | 41 | inferior |
| Comparative Example 10 | 0.65 | inferior | 44 | inferior |
| Comparative Example 11 | 0.59 | inferior | 39 | inferior |
| Comparative Example 12 | 0.59 | inferior | 40 | inferior |
| Comparative Example 13 | 0.41 | inferior | 38 | inferior |
| Comparative Example 14 | 0.38 | inferior | 38 | inferior |
| Comparative Example 15 | 0.38 | inferior | 36 | inferior |
| Comparative Example 16 | 0.31 | inferior | 45 | inferior |
| Comparative Example 17 | 0.31 | inferior | 40 | inferior |
| Comparative Example 18 | 0.33 | inferior | 44 | inferior |
| Comparative Example 19 | 0.30 | inferior | 45 | inferior |
| Comparative Example 20 | 0.34 | inferior | 46 | inferior |
| Comparative Example 21 | 0.44 | inferior | 31 | inferior |
| Comparative Example 22 | 0.45 | inferior | 38 | inferior |
| Comparative Example 23 | 0.44 | inferior | 38 | inferior |
| Comparative Example 24 | 0.49 | inferior | 33 | inferior |
| Comparative Example 25 | 0.36 | inferior | 42 | inferior |
| Comparative Example 26 | 0.33 | inferior | 50 | inferior |
| Comparative Example 27 | 0.29 | inferior | 36 | inferior |

TABLE 7-1

| | Amount of gas generated/mL | Evaluation of amount of gas generated | Capacity retention/% | Charging rate characteristic |
|---|---|---|---|---|
| Example 37 | 0.06 | good | 66 | good |
| Example 38 | 0.05 | good | 66 | good |
| Example 39 | 0.06 | good | 62 | good |
| Example 40 | 0.04 | good | 61 | good |
| Example 41 | 0.05 | good | 61 | good |
| Example 42 | 0.05 | good | 61 | good |
| Example 43 | 0.05 | good | 66 | good |
| Example 44 | 0.04 | good | 63 | good |
| Example 45 | 0.05 | good | 65 | good |
| Example 46 | 0.04 | good | 63 | good |
| Example 47 | 0.04 | good | 62 | good |
| Example 48 | 0.04 | good | 65 | good |
| Example 49 | 0.03 | good | 76 | good |
| Example 50 | 0.03 | good | 75 | good |
| Example 51 | 0.03 | good | 74 | good |
| Example 52 | 0.04 | good | 73 | good |
| Example 53 | 0.03 | good | 75 | good |
| Example 54 | 0.04 | good | 74 | good |
| Example 55 | 0.03 | good | 76 | good |
| Example 56 | 0.04 | good | 71 | good |
| Example 57 | 0.03 | good | 77 | good |
| Example 58 | 0.04 | good | 74 | good |
| Example 59 | 0.04 | good | 75 | good |
| Example 60 | 0.04 | good | 70 | good |
| Example 61 | 0.05 | good | 63 | good |
| Example 62 | 0.05 | good | 65 | good |
| Example 63 | 0.06 | good | 66 | good |
| Example 64 | 0.06 | good | 66 | good |
| Example 65 | 0.05 | good | 64 | good |
| Example 66 | 0.06 | good | 62 | good |
| Example 67 | 0.05 | good | 64 | good |
| Example 68 | 0.05 | good | 64 | good |
| Example 69 | 0.06 | good | 65 | good |
| Example 70 | 0.05 | good | 64 | good |
| Example 71 | 0.05 | good | 64 | good |
| Example 72 | 0.06 | good | 65 | good |

TABLE 8-1

| | Amount of gas generated/mL | Evaluation of amount of gas generated | Capacity retention/% | Charging rate characteristic |
|---|---|---|---|---|
| Example 73 | 0.15 | good | 63 | good |
| Example 74 | 0.12 | good | 63 | good |
| Example 75 | 0.13 | good | 63 | good |
| Example 76 | 0.15 | good | 61 | good |
| Example 77 | 0.15 | good | 65 | good |
| Example 78 | 0.14 | good | 63 | good |
| Example 79 | 0.16 | good | 64 | good |
| Example 80 | 0.14 | good | 67 | good |
| Example 81 | 0.13 | good | 61 | good |
| Example 82 | 0.13 | good | 66 | good |
| Example 83 | 0.14 | good | 63 | good |
| Example 84 | 0.16 | good | 63 | good |
| Example 85 | 0.10 | good | 74 | good |
| Example 86 | 0.10 | good | 77 | good |
| Example 87 | 0.10 | good | 74 | good |
| Example 88 | 0.09 | good | 77 | good |
| Example 89 | 0.09 | good | 75 | good |
| Example 90 | 0.10 | good | 76 | good |
| Example 91 | 0.10 | good | 77 | good |
| Example 92 | 0.10 | good | 75 | good |
| Example 93 | 0.10 | good | 71 | good |
| Example 94 | 0.12 | good | 72 | good |
| Example 95 | 0.13 | good | 73 | good |
| Example 96 | 0.13 | good | 75 | good |
| Example 97 | 0.16 | good | 66 | good |
| Example 98 | 0.15 | good | 66 | good |
| Example 99 | 0.15 | good | 63 | good |
| Example 100 | 0.18 | good | 65 | good |
| Example 101 | 0.17 | good | 64 | good |
| Example 102 | 0.15 | good | 63 | good |
| Example 103 | 0.15 | good | 64 | good |
| Example 104 | 0.16 | good | 64 | good |
| Example 105 | 0.14 | good | 63 | good |
| Example 106 | 0.16 | good | 65 | good |
| Example 107 | 0.16 | good | 65 | good |
| Example 108 | 0.16 | good | 66 | good |

TABLE 7-2

| | Amount of gas generated/mL | Evaluation of amount of gas generated | Capacity retention/% | Charging rate characteristic |
|---|---|---|---|---|
| Comparative Example 28 | 0.89 | inferior | 35 | inferior |
| Comparative Example 29 | 0.81 | inferior | 36 | inferior |
| Comparative Example 30 | 0.71 | inferior | 33 | inferior |
| Comparative Example 31 | 0.69 | inferior | 41 | inferior |
| Comparative Example 32 | 0.68 | inferior | 45 | inferior |
| Comparative Example 33 | 0.69 | inferior | 45 | inferior |
| Comparative Example 34 | 0.66 | inferior | 49 | inferior |
| Comparative Example 35 | 0.70 | inferior | 42 | inferior |
| Comparative Example 36 | 0.89 | inferior | 39 | inferior |
| Comparative Example 37 | 0.85 | inferior | 38 | inferior |
| Comparative Example 38 | 0.79 | inferior | 41 | inferior |
| Comparative Example 39 | 0.77 | inferior | 41 | inferior |
| Comparative Example 40 | 0.75 | inferior | 41 | inferior |
| Comparative Example 41 | 0.59 | inferior | 53 | inferior |
| Comparative Example 42 | 0.61 | inferior | 44 | inferior |

TABLE 8-2

|  | Amount of gas generated/mL | Evaluation of amount of gas generated | Capacity retention/% | Charging rate characteristic |
|---|---|---|---|---|
| Comparative Example 43 | 1.31 | inferior | 44 | inferior |
| Comparative Example 44 | 1.30 | inferior | 45 | inferior |
| Comparative Example 45 | 1.36 | inferior | 46 | inferior |
| Comparative Example 46 | 1.29 | inferior | 46 | inferior |
| Comparative Example 47 | 1.31 | inferior | 48 | inferior |
| Comparative Example 48 | 1.89 | inferior | 36 | inferior |
| Comparative Example 49 | 1.77 | inferior | 37 | inferior |
| Comparative Example 50 | 1.78 | inferior | 38 | inferior |
| Comparative Example 51 | 2.11 | inferior | 32 | inferior |
| Comparative Example 52 | 2.10 | inferior | 33 | inferior |
| Comparative Example 53 | 1.44 | inferior | 46 | inferior |
| Comparative Example 54 | 1.42 | inferior | 46 | inferior |
| Comparative Example 55 | 1.41 | inferior | 45 | inferior |
| Comparative Example 56 | 1.39 | inferior | 42 | inferior |
| Comparative Example 57 | 1.89 | inferior | 39 | inferior |
| Comparative Example 58 | 1.78 | inferior | 35 | inferior |
| Comparative Example 59 | 2.00 | inferior | 33 | inferior |
| Comparative Example 60 | 1.99 | inferior | 34 | inferior |
| Comparative Example 61 | 2.01 | inferior | 32 | inferior |
| Comparative Example 62 | 1.99 | inferior | 32 | inferior |
| Comparative Example 63 | 2.01 | inferior | 36 | inferior |
| Comparative Example 64 | 1.31 | inferior | 41 | inferior |
| Comparative Example 65 | 1.36 | inferior | 40 | inferior |
| Comparative Example 66 | 1.41 | inferior | 40 | inferior |
| Comparative Example 67 | 1.98 | inferior | 39 | inferior |
| Comparative Example 68 | 1.55 | inferior | 50 | inferior |
| Comparative Example 69 | 1.94 | inferior | 38 | inferior |

In the cells from Examples 1 to 108, expanding and loosening caused by the gas generation were not observed and it was confirmed that they had the good charging rate characteristic. On the other hand, in Comparative Examples 1 to 69, the low charging rate characteristic could be measured at the first time, but the charge capacity as remarkably decreased at the second time or after that. Further, the extremely low battery capacity was observed when the high charging rate characteristic was measured, and the gas generation was also observed.

In Examples 1 to 36 in which the positive electrode contains the lithium cobaltate in addition to the spinel type lithium manganate, the amount of gas generated is smaller than that in Examples 37 to 108 in which the positive electrode contains the cobalt oxide. This can be considered that, similar to the case of the evaluation of the cycle characteristic described above, the hydrogen absorption by the lithium cobaltate and the formation of the coating was well-balanced, thus resulting in the inhibition of the gas generation.

With respect to Comparative Examples 1 to 12, 28 to 39, and 43 to 54, the following reasons can be considered. When a high voltage was applied to the lithium cobaltate and cobalt oxide, the decomposition reactions themselves are advanced. For that reason, it can be considered that these decomposition reactions exceed the reducing effects obtained by the combination of the present invention, because the lithium cobaltate or cobalt oxide was contained in a given amount or more.

With respect to Comparative Examples 13 to 24 and 55 to 66, it can be considered that the gases generated could not be absorbed because the positive electrode did not contain the lithium cobaltate or cobalt oxide.

With respect to Comparative Examples 25 to 2, 40 to 42, and 67 to 69, any of compounds 1-1 to 4-3 was not contained, the coating was not formed on the negative electrode or positive electrode, and thus the reaction of the spinel type lithium titanate with the nonaqueous electrolyte or the reaction of the spinel type lithium manganate with the nonaqueous electrolyte, due to the high voltage, and the reaction of the lithium cobaltate or cobalt oxide with the nonaqueous electrolyte could not be inhibited, thus resulting in the gas generation.

From the results described above, it becomes clear that in the nonaqueous electrolyte secondary battery having the structure having the negative electrode using the titanium-containing oxide and the positive electrode using the spinel type lithium manganate, when the cobalt-containing compound and/or the lithium-transition metal composite oxide having the stratified rock salt type structure are contained in the positive electrode, and one compound selected from the group consisting the organic compound having an oxalic acid backbone, the organic compound having an isocyanate group, the lithium salt of an organic compound having a sulfonic acid backbone, and the succinic anhydride compound having a side chain with 3 or more carbon atoms is contained in the nonaqueous electrolyte in a range defined by the present invent on, the gas generation can be inhibited during the charge/discharge cycle, and the cycle stability is excellent and the charging rate characteristic is improved.

Further, it becomes also clear that the more excellent effect of inhibiting the gas generation is obtained in the case in which the positive electrode contains the lithium-transition metal composite oxide having the stratified rock salt type structure such as lithium cobaltate than the case in which the positive electrode contains the cobalt-containing compound (cobalt compound containing no Li), and thus the former case is more preferable than the latter case.

The invention claimed is:

1. A nonaqueous electrolyte secondary battery, comprising:
a negative electrode including a negative electrode active material which comprises a titanium-containing oxide;
a positive electrode including a positive electrode active material which comprises a spinel type lithium manganate and at least one of a cobalt-containing compound and a lithium-transition metal composite oxide having a stratified rock salt type structure; and a nonaqueous electrolyte between the negative electrode and the positive electrode, wherein the spinel type lithium manganate has the following formula:

$$Li_{1+x}M_yMn_{2-x-y}O_4,$$

wherein $0 \leq x \leq 0.2$, $0 < y \leq 0.6$, and M is at least one of elements belonging to Groups 2 to 13 and Periods 3 and 4 other than Mn, the positive electrode active material satisfies the following relationship:

$$0.01 \leq B/(A+B) \leq 0.1,$$

wherein A is a weight of the spinel type lithium manganate, and B is a weight of the at least one of the cobalt-containing compound and the lithium-transition metal composite oxide, and the nonaqueous electrolyte comprises at least one compound selected from the group consisting of an organic compound having an oxalic acid backbone, an organic compound having an isocyanate group, a lithium salt of an organic compound having a sulfonic acid backbone, and a succinic anhydride compound having a side chain with 3 or more carbon atoms, in an amount of from 0.01 to 5% by weight with respect to 100% by weight of the nonaqueous electrolyte.

2. The nonaqueous electrolyte secondary battery according to claim 1, wherein the nonaqueous electrolyte comprises the organic compound having an oxalic acid backbone represented by the following formula (1):

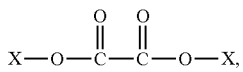

(1)

wherein X is an alkyl group having 1 to 6 carbon atoms, an alkenyl group having 2 to 6 carbon atoms, or an alkynyl group having 2 to 6 carbon atoms.

3. The nonaqueous electrolyte secondary battery according to claim 1, wherein the nonaqueous electrolyte comprises the organic compound having an isocyanate group represented by the following formula (2):

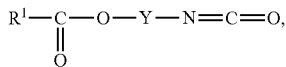

(2)

wherein $R^1$ is an hydrogen atom, an alkyl group having 1 to 6 carbon atoms, an alkenyl group having 2 to 6 carbon atoms, an aryl group having 6 to 12 carbon atoms, an alkyloxy group having 1 to 6 carbon atoms, an alkenyloxy group having 2 to 6 carbon atoms, an isocyanatoalkyloxy group having 2 to 6 carbon atoms, or an aryloxy group having 6 to 12 carbon atoms, in which at least one hydrogen atom in the alkyl group, the alkenyl group, the aryl group, the alkyloxy group, the alkenyloxy group, and the isocyanatoalkyloxy group is optionally substituted by a halogen atom; and Y is an alkylene group having 1 to 6 carbon atoms in which at least one hydrogen atom is optionally substituted by a halogen atom, or a bivalent linking group having 2 to 6 carbon atoms and containing at least one ether bond.

4. The nonaqueous electrolyte secondary battery according to claim 1, wherein the nonaqueous electrolyte comprises the lithium salt of an organic compound having a sulfonic acid backbone represented by the following formula (3):

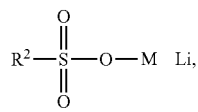

(3)

where $R^2$ is an alkyl group having 1 to 6 carbon atoms, and M is $BF_3$ or $PF_5$.

5. The nonaqueous electrolyte secondary battery according to claim 1, wherein the nonaqueous electrolyte comprises the succinic anhydride compound having a side chain with 3 or more carbon atoms represented by the following formula (4):

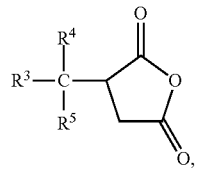

(4)

wherein $R^3$ and $R^4$ are each independently a hydrogen atom, a halogen atom, or an alkyl group having 1 to 6 carbon atoms in which at least one hydrogen atom is optionally substituted by a halogen; and $R^5$ is an alkenyl group having 2 to 4 carbon atoms and a double bond at a terminal thereof, or an alkynyl group having 2 to 4 carbon atoms and a triple bond at a terminal thereof.

6. The nonaqueous electrolyte secondary battery according to claim 1, wherein M is at least one element selected from the group consisting of Al, Mg, Zn, Ni, Co, Fe, Ti, Cu, and Cr.

7. The nonaqueous electrolyte secondary battery according to claim 1, wherein the positive electrode active material comprises the spinel type lithium manganate and the lithium-transition metal composite oxide.

8. The nonaqueous electrolyte secondary battery according to claim 1, wherein the positive electrode active material comprises the lithium-transition metal composite oxide represented by $Li_aNi_bCo_cMn_dX_eO_2$, wherein X is at least one element selected from the group consisting of B, Mg, Al, Si, Ti, V, Cr, Fe, Cu, Zn, Ga, Ge, Sr, Zr, Nb, Mo, In, and Sn; $0 < a \leq 1.2$; $0 \leq b, c, d, e \leq 1$; and $b+c+d+e=1$.

9. The nonaqueous electrolyte secondary battery according to claim 1, wherein the positive electrode active material comprises the lithium-transition metal composite oxide which is lithium cobaltate of the formula $LiCoO_2$.

10. The nonaqueous electrolyte secondary battery according to claim 1, wherein the positive electrode active material comprises the cobalt-containing compound which is at least one compound selected from the group consisting of $Co_3O_4$, $Co_2O_3$, $CoO$, $CoOOH$, and $CoCO_3$.

11. The nonaqueous electrolyte secondary battery according to claim 1, wherein the titanium-containing oxide is at least one of lithium titanate and titanium dioxide.

12. A battery pack, comprising:
a plurality of nonaqueous electrolyte secondary batteries connected to each other, each of which is the nonaqueous electrolyte secondary battery according to claim 1.

13. An electricity storage system, comprising:
the nonaqueous electrolyte secondary battery according to claim 1.

14. The nonaqueous electrolyte secondary battery according to claim 1, further comprising:
a separator positioned between the negative electrode and the positive electrode.

15. The nonaqueous electrolyte secondary battery according to claim 1, wherein the positive electrode active material satisfies $0.02 \leq (B/(A+B)) \leq 0.1$.

16. The nonaqueous electrolyte secondary battery according to claim 9, wherein the positive electrode active material satisfies $0.02 \leq B/(A+B) < 0.05$.

17. The nonaqueous electrolyte secondary battery according to claim 16, wherein the titanium-containing oxide is at least one of lithium titanate and titanium dioxide.

18. The nonaqueous electrolyte secondary battery according to claim 16, wherein the titanium-containing oxide is lithium titanate.

19. The nonaqueous electrolyte secondary battery according to claim 17, wherein the organic compound having an oxalic acid backbone is a compound of the following formula (1):

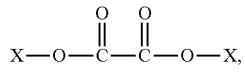

(1)

wherein X is an alkyl group having 1 to 6 carbon atoms, an alkenyl group having 2 to 6 carbon atoms, or an alkynyl group having 2 to 6 carbon atoms,
wherein the organic compound has an isocyanate group is a compound of the following formula (2):

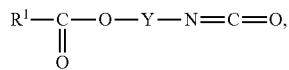

(2)

wherein $R^1$ is an hydrogen atom, an alkyl group having 1 to 6 carbon atoms, an alkenyl group having 2 to 6 carbon atoms, an aryl group having 6 to 12 carbon atoms, an alkyloxy group having 1 to 6 carbon atoms, an alkenyloxy group having 2 to 6 carbon atoms, an isocyanatoalkyloxy group having 2 to 6 carbon atoms, or an aryloxy group having 6 to 12 carbon atoms, in which at least one hydrogen atom in the alkyl group, the alkenyl group, the aryl group, the alkyloxy group, the alkenyloxy group, and the isocyanatoalkyloxy group is optionally substituted by a halogen atom; and Y is an alkylene group having 1 to 6 carbon atoms in which at least one hydrogen atom is optionally substituted by a halogen atom, or a bivalent linking group having 2 to 6 carbon atoms and containing at least one ether bond,
wherein the lithium salt of an organic compound having a sulfonic acid backbone is a compound of the following formula (3):

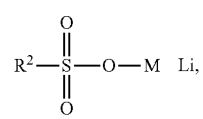

(3)

wherein $R^2$ is an alkyl group having 1 to 6 carbon atoms, and M is $BF_3$ or $PF_5$, and
wherein the succinic anhydride compound having a side chain with 3 or more carbon atoms is a compound of the following formula (4):

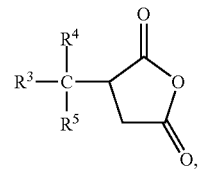

(4)

wherein $R^3$ and $R^4$ are each independently a hydrogen atom, a halogen atom, or an alkyl group having 1 to 6 carbon atoms in which at least one hydrogen atom is optionally substituted by a halogen; and $R^5$ is an alkenyl group having 2 to 4 carbon atoms and a double bond at a terminal thereof, or an alkynyl group having 2 to 4 carbon atoms and a triple bond at a terminal thereof.

20. The nonaqueous electrolyte secondary battery according to claim 1, wherein the cobalt-containing compound is at least one compound selected from the group consisting of $Co_3O_4$, $Co_2O_3$, $CoO$, $CoOOH$, and $CoCO_3$, and the lithium-transition metal composite oxide is lithium cobaltate of the formula $LiCoO_2$.

* * * * *